(12) United States Patent
Kwak et al.

(10) Patent No.: US 11,281,812 B2
(45) Date of Patent: Mar. 22, 2022

(54) STORAGE DEVICE AND SOLID STATE DRIVE DEVICE WITH STRUCTURE FOR REMOVING SECURE DATA, AND DATA CENTER INCLUDING THE SAME

(71) Applicant: SAMSUNG ELECTRONICS CO., LTD., Suwon-Si (KR)

(72) Inventors: Insub Kwak, Seoul (KR); Sungki Lee, Seoul (KR); Chunghyun Ryu, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 17/123,538

(22) Filed: Dec. 16, 2020

(65) Prior Publication Data

US 2021/0334413 A1 Oct. 28, 2021

(30) Foreign Application Priority Data

Apr. 22, 2020 (KR) .................... 10-2020-0048453

(51) Int. Cl.
*G06F 1/16* (2006.01)
*H05K 5/00* (2006.01)
*H05K 7/00* (2006.01)
*G06F 21/78* (2013.01)
*H05K 5/02* (2006.01)

(52) U.S. Cl.
CPC ........... *G06F 21/78* (2013.01); *H05K 5/0052* (2013.01); *H05K 5/0256* (2013.01)

(58) Field of Classification Search
CPC ....... G06F 21/78; G06F 21/79; H05K 5/0052; H05K 5/0256; H05K 5/0047; H05K 5/006; H05K 5/0026; H05K 5/026; H05K 5/0265; H05K 5/0269; H05K 5/02
See application file for complete search history.

(56) References Cited

U.S. PATENT DOCUMENTS

| 7,099,110 | B2 | 8/2006 | Detzler |
| 7,517,252 | B2 | 4/2009 | Ni et al. |
| 7,757,301 | B2 | 7/2010 | Miller et al. |
| 9,195,858 | B2 | 11/2015 | Trantham |
| 2004/0103302 | A1 | 5/2004 | Yoshimura et al. |
| 2005/0262361 | A1* | 11/2005 | Thibadeau ............ G06F 21/80 713/193 |
| 2006/0198515 | A1* | 9/2006 | Forehand .............. G06F 21/80 380/28 |

(Continued)

FOREIGN PATENT DOCUMENTS

| KR | 10-1897585 | 9/2016 |
| KR | 10-1928750 | 12/2018 |

*Primary Examiner* — Anthony M Haughton
(74) *Attorney, Agent, or Firm* — F.Chau & Associates, LLC

(57) ABSTRACT

A storage device includes a substrate, at least one secure element, a case and a coupling structure. The secure element is mounted on the substrate. The case surrounds the substrate and the secure element. The coupling structure integrally couples the secure element and the case. When at least a part of the case is removed, the secure element is destroyed while a connection remains between the secure element and the case by the coupling structure, and access to secure data stored in the secure element is prevented.

20 Claims, 24 Drawing Sheets

(56) References Cited

U.S. PATENT DOCUMENTS

| | | | |
|---|---|---|---|
| 2007/0033454 A1* | 2/2007 | Moss | G06F 21/74 |
| | | | 714/724 |
| 2007/0192631 A1* | 8/2007 | Anderson | H04N 21/42684 |
| | | | 713/193 |
| 2009/0052665 A1* | 2/2009 | Goodman | G06F 21/78 |
| | | | 380/44 |
| 2009/0100273 A1* | 4/2009 | Miller | G11B 20/00246 |
| | | | 713/193 |
| 2014/0373166 A1* | 12/2014 | Little | G06F 21/79 |
| | | | 726/26 |

* cited by examiner

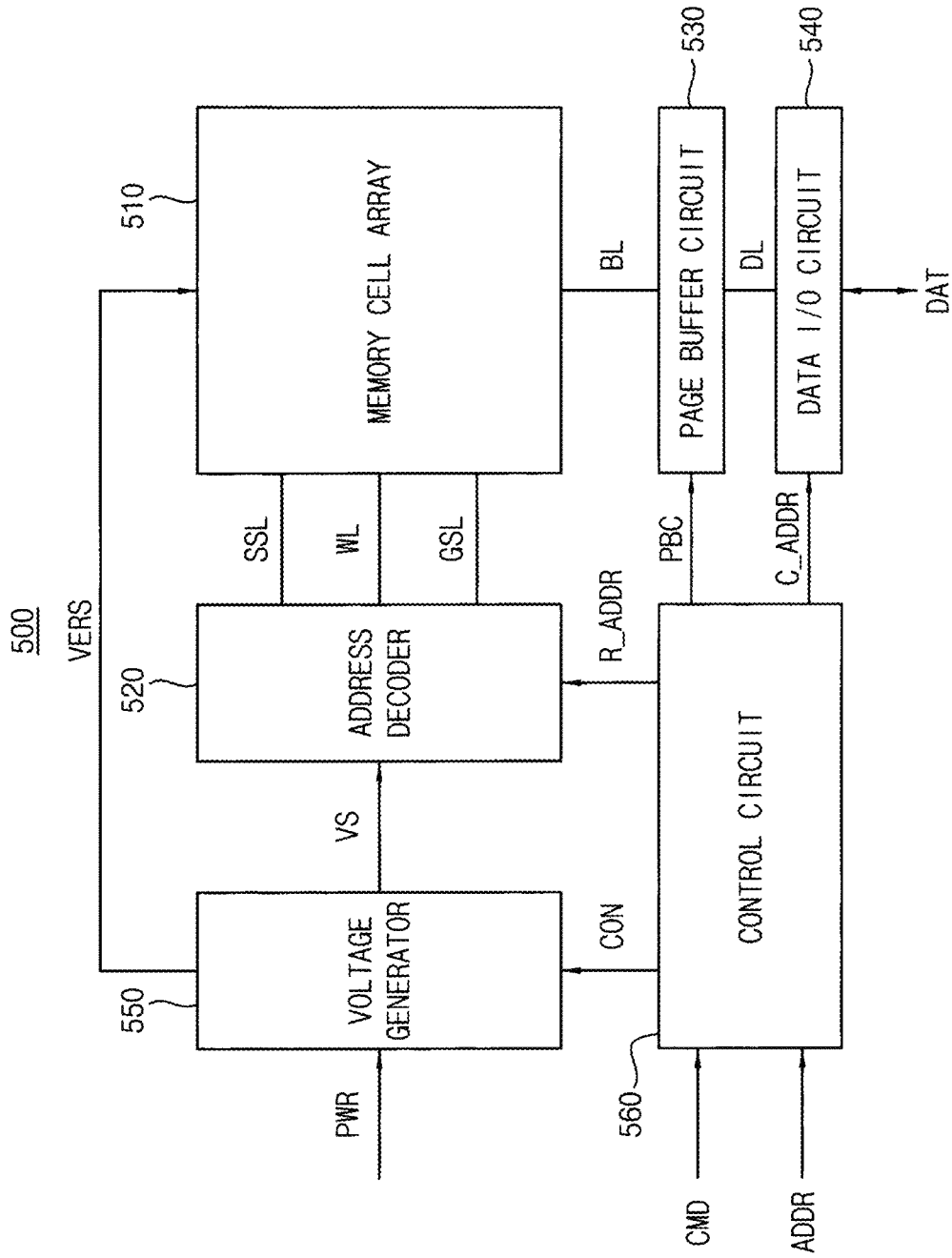

STORAGE DEVICE AND SOLID STATE DRIVE DEVICE WITH STRUCTURE FOR REMOVING SECURE DATA, AND DATA CENTER INCLUDING THE SAME

CROSS-REFERENCE TO RELATED APPLICATION

This application claims priority under 35 USC § 119 from, and, the benefit of, Korean Patent Application No. 10-2020-0048453, filed on Apr. 22, 2020 in the Korean intellectual Property Office (KIPO), the contents of which are herein incorporated by reference in their entirety.

BACKGROUND

1. Technical Field

Exemplary embodiments are generally directed to semiconductor integrated circuits, and more particularly to storage devices and solid state drive (SSD) devices with structures that remove secure data, and data centers that include the storage devices.

2. Description of the Related Art

Hard disk drive (HDD) devices are typically used as data storages for electronic devices. Recently, however, solid state drive (SSD) devices that include nonvolatile memory devices, such as flash memories, are being used instead of HDD devices as data storages for electronic devices.

SSD devices are used instead of HDD devices because SSD devices do not include a mechanical device, such as a motor, and almost no heat or noise is produced in SSD devices. In addition, SSD devices have a fast access rate, high density, and high stability.

Recently, as the industry has advanced, the storage and management of secure data has become important, and applications for reinforcing security are developing various fields such as defense, financial and/or finance. SSD devices are media that have low power and high speed, however, there may be security issues such as data leakage in the event of loss or theft. Accordingly, various security-related solutions and/or technologies have been proposed to prevent data leakage.

Conventionally, when a case is removed, elements inside a module may be seen and hacked. To prevent an external intrusion, the presence or absence of intrusion can be checked by making a device that can leave an intrusion trace on an outside of the case, but there was no fundamental component destruction and removal technology.

SUMMARY

At least one exemplary embodiment of the present disclosure provides a storage device and a solid slate drive (SSD) device that have a structure that can efficiently remove secure data in the event of theft, loss and/or disposal.

At least one exemplary embodiment of the present disclosure provides a data center that includes the storage device and/or the SSD device.

According to exemplary embodiments, a storage device includes a substrate, at least one secure element, a case and a coupling structure. The secure element is mounted on the substrate. The case surrounds the substrate and the secure element. The coupling structure integrally couples the secure element and the case. When at least a part of the case is removed, the secure element is destroyed while a connection is maintained between the secure element and the case by the coupling structure, and access to secure data stored in the secure element is prevented.

According to exemplary embodiments, a storage device includes a substrate, at least one secure element, a case and a coupling structure. The secure element is mounted on the substrate. The case surrounds the substrate and the secure element. The coupling structure integrally couples the secure element and the case. When at least a part of the case is removed, the secure element is separated and removed from the substrate while a connection is maintained between the secure element and the case by the coupling structure, and access to secure data stored in the secure element is prevented.

According to exemplar embodiments, a solid state drive (SSD) device includes a substrate, a plurality of nonvolatile memories, at least one secure memory, a controller, a case and a coupling structure. The plurality of nonvolatile memories are mounted on the substrate and store normal data. The secure memory is mounted on the substrate and stores secure data. The controller is mounted on the substrate and controls operations of the plurality of nonvolatile memories and the secure memory. The case surrounds the substrate, the plurality of nonvolatile memories, the secure memory and the controller. The coupling structure integrally couples the secure memory and the case. When at least a part of the case is removed, the secure memory is destroyed or the secure memory is separated and removed from the substrate while a connection is maintained between the secure memory and the case by the coupling structure, and access to the secure data stored in the secure memory is prevented.

According to exemplary embodiments, a data center includes at least one application server and at least one storage server. The application server receives a data write request or a data read request. The storage server includes a storage device that stores write data that corresponds to the data write request or outputs read data that corresponds to the data read request. The storage device includes a substrate, at least one secure element, a case and a coupling structure. The secure element is mounted on the substrate. The case surrounds the substrate and the secure element. The coupling structure integrally couples the secure element and the case. When at least a part of the case is removed, the secure element is destroyed or the secure element is separated and removed from the substrate while a connection is maintained between the secure element and the case by the coupling structure and access to secure data stored in the secure element is prevented.

In a storage device, an SSD device and a data center according to exemplary embodiments, a coupling structure is provided that integrally couples the secure element and the case. When at least the part of the case is removed, access to the secure data is prevented or blocked by destroying the secure element or removing or extracting the secure element. Accordingly, in the event of theft, loss or disuse of the storage device, the secure data can be effectively eliminated by the physical operation of using the coupling structure. For example, in the event of loss or theft of a module-type storage device, leakage of secure data can be prevented by such functions according to exemplary embodiments. In addition, when a user wants to discard or stop using the storage device, the end of use of the storage device can be confirmed by such functions according to exemplary embodiments.

BRIEF DESCRIPTION OF THE DRAWINGS

FIG. 30 is a block diagram of an embodiment of a memory included in the storage device of FIG. 28 or FIG. 29.

DETAILED DESCRIPTION OF THE EMBODIMENTS

Figure 1:
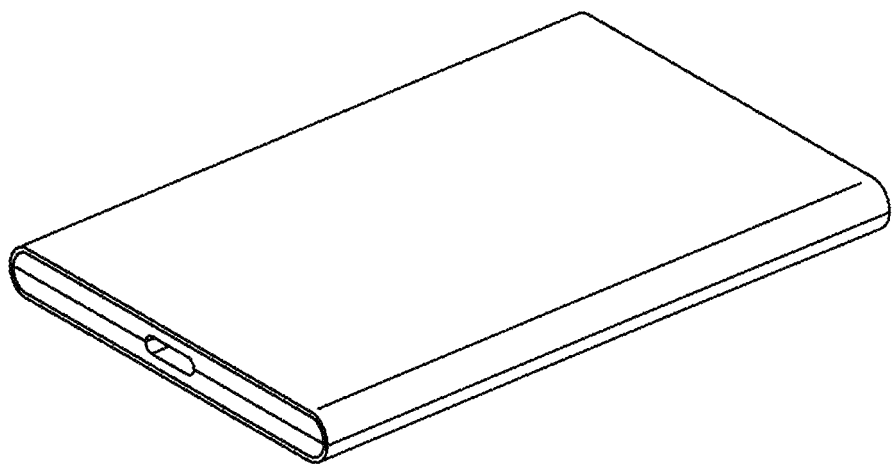
FIG. 1 is a perspective view of a storage device according to exemplary embodiments.

Various exemplary embodiments will be described more fully with reference to the accompanying drawings, in which embodiments are shown. The present disclosure may, however, be embodied in many different forms and should not be construed as limited to the embodiments set forth herein. Like reference numerals may refer to like elements throughout this application.

Figure 2:
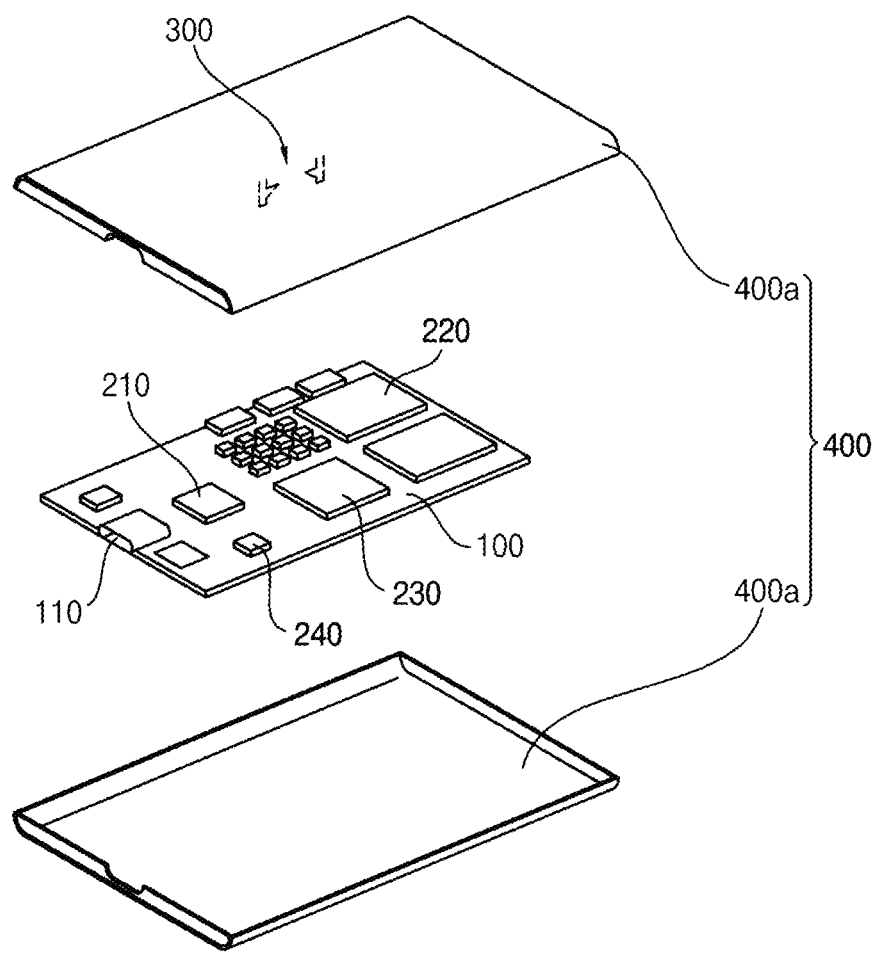
FIG. 2 is an exploded perspective view of the storage device of FIG. 1.

FIG. 1 is a perspective view of a storage device according to exemplary embodiments. FIG. 2 is an exploded perspective view of the storage device of FIG. 1.

Referring to FIGS. 1 and 2, according to an embodiment, a storage device 10 includes a substrate 100, a plurality of electronic elements 210, 220, 230 and 240 mounted or disposed on the substrate 100, a case 400 that surrounds the substrate 100 and the electronic elements 210, 220, 230 and 240, and a coupling structure 300. In addition, the storage device 10 may further include a bracket that covers the electronic elements 210, 220, 230 and 240, a heat dissipating pad that is in thermal communication with the electronic elements 210, 220, 230 and 240, etc.

In some exemplary embodiments, the storage device 10 is a solid state drive (SSD) device. For example, the storage device 10 may be a SSD device used in a data center, server, etc., that collects various data and provides various services, or may be a portable SSD device that replaces a hard disk drive (HDD) device in a personal computer (PC), a laptop, etc.

Hereinafter, exemplary embodiments will be described based on an example where the storage device 10 is a SSD device. However, exemplary embodiments are not limited thereto, and the storage device 10 may be one of a universal flash storage (UFS), a multi media card (MMC), an embedded multi media card (eMMC), a secure digital (SD) card, a micro SD card, a memory stick, a chip card, a universal serial bus (USB) card, a smart card, or a compact flash it card, etc.

The substrate 100 may be a single-layered or multi-layered circuit substrate and has an upper surface and a lower surface opposite to each other. For example, the substrate 100 may be a printed circuit board (PCB). The PCB includes wirings and vias connected to the wirings. The wirings include printed circuit patterns that interconnect with the electronic elements.

In an embodiment, the substrate 100 extends in a first or lengthwise direction and a second or widthwise direction. The substrate 100 has a rectangular or square shape. The substrate 100 has a first side portion and a second side portion opposite to each other. A connector 110 that has connection terminals that connect with an external host device is provided at the first side portion of the substrate 100. The storage device 10 can be attached to or detached from an external host device through the connector 110. Accordingly, the storage device 10 can be electrically connected to the external host device through the connector 110.

In an embodiment, plurality of electronic elements 210, 220, 230 and 240 are mounted on the substrate 100 along the first direction. The plurality of electronic elements 210, 220, 230 and 240 includes a controller 210, a plurality of nonvolatile memories 220, a buffer memory 230 and a secure element 240.

In an embodiment, the controller 210 is disposed or positioned adjacent to the connector 110 on the upper surface of the substrate 100. The plurality of nonvolatile memories 220 are disposed or positioned adjacent to the second side portion opposite to the connector 110 on the upper surface of the substrate 100. For example, as illustrated in FIG. 2, two nonvolatile memories 220 are disposed on the upper surface of the substrate 100. In addition, the nonvolatile memories may be additionally disposed on the lower surface of the substrate 100. The buffer memory 230 and the secure element 240 are disposed or positioned adjacent to the controller 210 on the upper surface of the substrate 100.

In an embodiment, controller 210 controls overall operations of the storage device 10, controls operations of the plurality of nonvolatile memories 220, the buffer memory 230 and the secure element 240, and communicates signals with the host device using a host interface. For example, the signals communicated between the controller 210 and the host device may include a command, an address, data, etc. The controller 210 analyzes and processes the signals received from the host device, and controls the operation of the plurality of nonvolatile memories 220 based on the received command, address and data.

In some exemplary embodiments, the host interface includes a block accessible interface which includes at least one of, for example, a universal serial bus (USB), a small computer system interface (SCSI) bus, a peripheral component interconnect (PCI) express bus, an advanced technology attachment (ATA) bus, a serial ATA (SATA) bus, a parallel ATA (PATA) bus, a serial attached SCSI (SAS) bus, or a nonvolatile memory express (NVMe) bus, etc. The storage device 10 uses a block accessible address space that corresponds to an access size of the plurality of nonvolatile memories 220 to provide a block accessible interface to the host device, that allows access by memory block units with respect to data stored in the plurality of nonvolatile memories 220.

In an embodiment, the plurality of nonvolatile memories 220 are the storage medium of the storage device 10, and are connected to the controller 210 through at least one channel. For example, the plurality of nonvolatile memories 220 stores normal data, e.g., meta data, various user data, etc.

In some exemplary embodiments, each of the plurality of nonvolatile memories 220 includes a NAND flash memory. In other exemplary embodiments, each of the plurality of nonvolatile memories 220 includes one of a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM), etc.

In an embodiment, the buffer memory 230 stores instructions or data that are executed or processed by the controller 210, and can temporarily store data that is stored in or will be stored in the plurality of nonvolatile memories 220. In addition, the buffer memory 230 can be used to drive software or firmware that is used to manage the plurality of nonvolatile memories 220. Further, the buffer memory 230 can be used to store meta data received from the host device or used to store cache data.

In some exemplary embodiments, the buffer memory 230 includes a volatile memory, such as a dynamic random access memory (DRAM) or a static random access memory (SRAM), etc. In other exemplary embodiments, the buffer memory 230 includes at least one nonvolatile memory.

In an embodiment, the secure element 240 is a secure memory or any security device. The secure element 240 processes or stores secure data such as cryptographic keys, sensitive data, sensitive code, etc. For example, the secure element 240 is resistant against tampering attacks, such as micro-probing, software attacks, eavesdropping, fault injection attacks, etc. The secure element 240 may be referred to as a security hardware, a security component or a security module.

In an embodiment, the storage device 10 further includes a power management integrated circuit (PMIC) that controls power transmitted to the plurality of electronic elements 210, 220, 230 and 240, and to passive elements such as capacitors, etc.

In an embodiment, the substrate 100 and the plurality of electronic elements 210, 220, 230 and 240 are fastened to the case 400, so that the substrate 100 and the plurality of electronic elements 210, 220, 230 and 240 are fixedly positioned within the case 400. For example, the case 400 includes a lower case 400b on which the substrate 100 is mounted, and an upper case 400a coupled with the lower case 400b to cover the substrate 100 and the plurality of electronic elements 210, 220, 230 and 240. However, exemplary embodiments are not limited thereto, and in other embodiments, the upper case 400a and the lower case 400b are integrally formed.

In some exemplary embodiments, the case 400 includes at least one of various materials, such as a metal, a plastic, such as a polymer, a film, or an epoxy-coated material, etc.

In an embodiment, the coupling structure 300 is a physical structure that integrally couples the secure element 240 and the case 400. For example, as illustrated in FIG. 2, when the secure element 240 is disposed on the upper surface of the substrate 100, the coupling structure 300 is formed on the upper case 400a. However, exemplary embodiments are not limited thereto, and when the secure element 240 is disposed on the lower surface of the substrate 100, the coupling structure 300 is formed on the lower case 400b.

In some exemplary embodiments, the coupling structure 300 improves or enhances the security performance of the storage device 10, and can destroy the secure element 240. For example, as will be described with reference to FIGS. 3 through 19, when at least a part of the case 400 is removed or damaged, etc., the secure element 240 may be destroyed even though the coupling structure 300 maintains a connection between the secure element 240 and the case 400. Destruction of the secure element 240 means that the secure element 240 is completely or permanently physically damaged, and thus access to secure data in the secure element 240 is prevented.

In other exemplary embodiments, the coupling structure 300 improves or enhances the security performance of the storage device 10, and can electrically separate and remove the secure element 240. For example, as will be described with reference to FIGS. 20 through 26, when at least a part of the case 400 is removed, the secure element 240 can be electrically separated and removed from the substrate 100 even though the coupling structure 300 maintains a connection between the secure element 240 and the case 400. After separating and removing the secure element 240, using the storage device 10 to access secure data stored in the secure element 240 is essentially impossible. However, unlike the above-described destruction of the secure element 240, the secure element 240 is not completely or permanently physically damaged by the separation and removal of the secure element 240. When the secure element 240 is electrically connected to the substrate 100 again after having been separated and removed from the substrate 100, access to the secure data stored in the secure element 240 is restored.

According to exemplary embodiments, in the event of theft, loss or disuse of the storage device 10, the secure data can be effectively eliminated by a physical operation os using the coupling structure 300, and thus leakage of the secure data can be prevented.

Although FIG. 2 illustrates an embodiment where the coupling structure 300 is directly incorporated into or integrally formed with the case 400, such as the upper case 400a, exemplary embodiments are not limited thereto, and the coupling structure 300 can be modified in other exemplary embodiments. Various embodiments of the coupling structure 300 will be described with reference to FIGS. 3 through 26.

Hereinafter, exemplary embodiments will be described based on an example where the secure element 240 is disposed on the upper surface of the substrate 100 and the coupling structure 300 is formed in the upper case 400a.

FIGS. 3, 4A, 4B and 5 are cross-sectional views of an embodiment of a coupling structure included in the storage device of FIG. 1.

Figure 3:
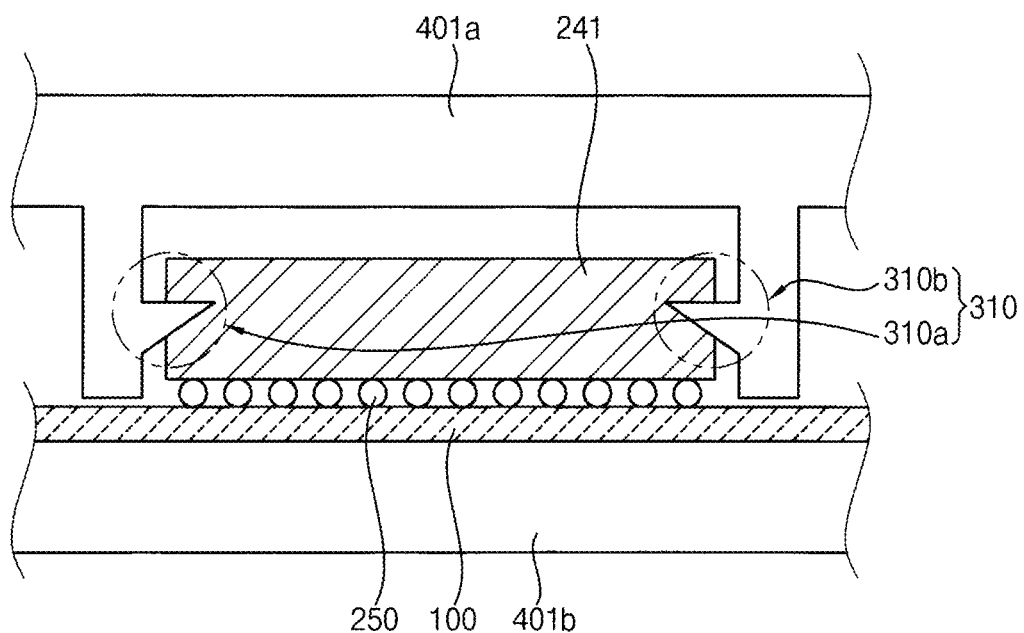
FIGS. 3, 4A, 4B and 5 are cross-sectional views of an embodiment of a coupling structure included in the storage device of FIG. 1.
Figure 4A:
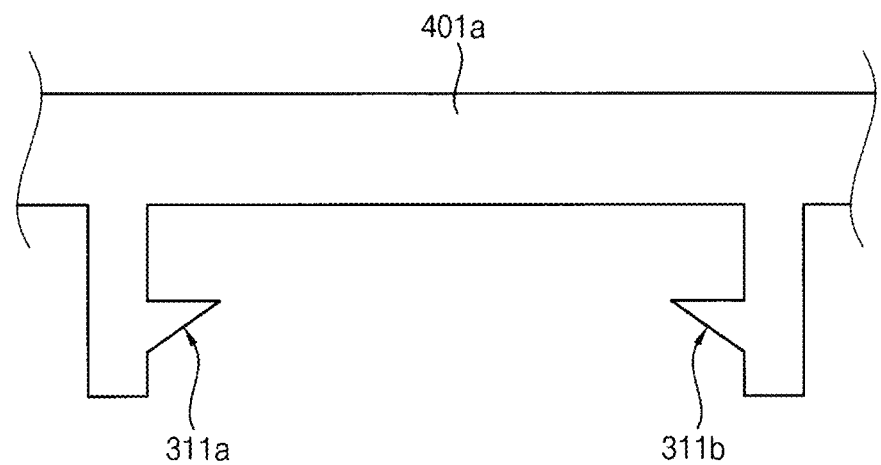
Figure 4B:
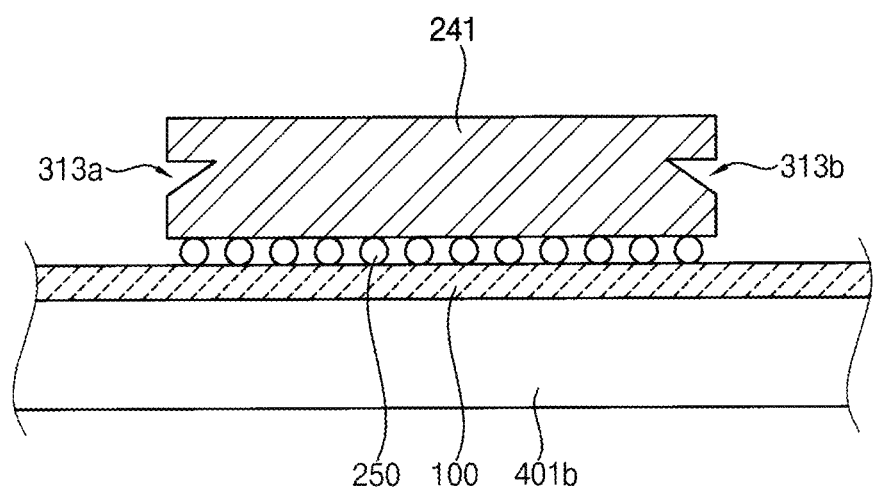
Figure 5:
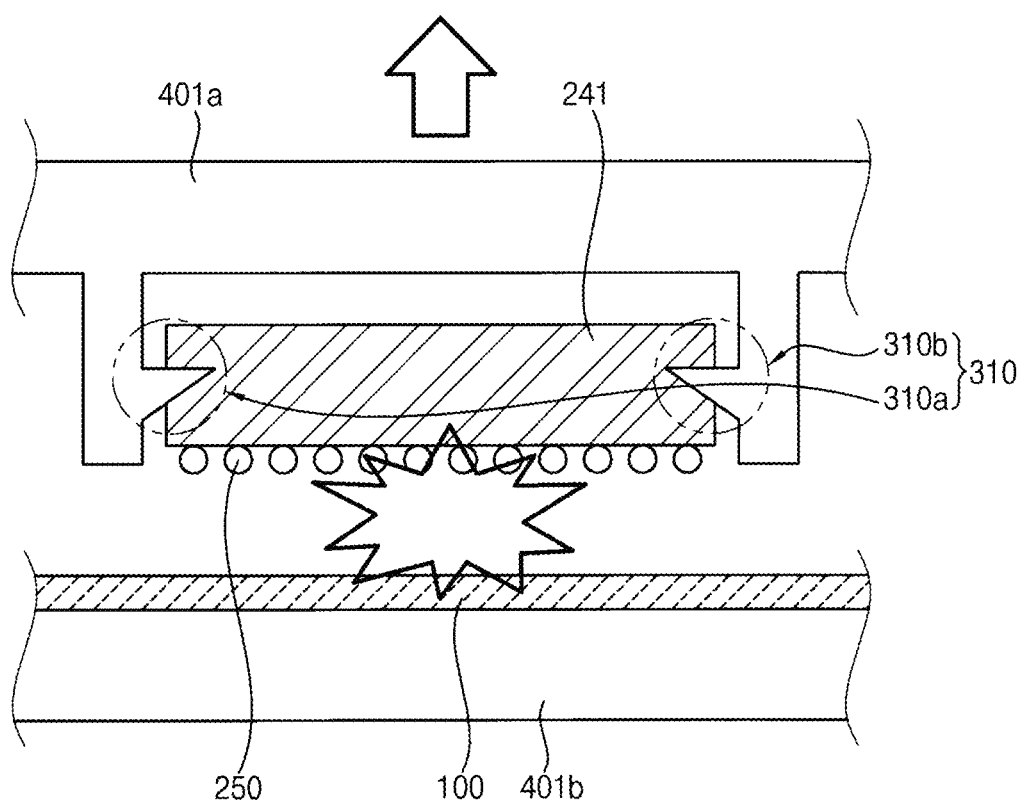

FIG. 3 illustrates an embodiment in which a secure element 241 and an upper case 401a are integrally coupled or combined by a coupling structure 310. FIG. 4A illustrates the upper case 401a before being coupled with the secure element 241, and FIG. 4B illustrates the secure element 241 before being coupled with the upper case 401a. FIG. 5 illustrates the upper case 401a being removed or separated after the secure element 241 and the upper case 401a have been integrally coupled by the coupling structure 310.

Referring to FIGS. 3, 4A, 4B and 5, in an embodiment, the substrate 100 is mounted and fixed to a lower case 401b. Although FIG. 3 illustrates that the substrate 100 is in direct contact with the lower case 401b, this is for convenience of illustration, and in an actual implementation, the substrate 100 and the lower case 401b may be spaced apart from each other and at least one space may be formed between the substrate 100 and the lower case 401b.

In an embodiment, the secure element 241 is mounted on the substrate 100 via conductive bumps 250, such as solder bumps. The secure element 241 and the upper case 401a are integrally coupled by the coupling structure 310. The secure element 241 and the upper case 401a are spaced apart from each other by the coupling structure 310 and at least one space is formed between the secure element 241 and the upper case 401a.

In an embodiment, the coupling structure 310 includes a first coupler 310a and a second coupler 310b. The first coupler 310a extends downword from a lower surface of the upper case 401a and includes a first protrusion 311a, and a first coupling part 313a formed on a first surface, such as a first side surface, of the secure element 241. The second coupler 310b extends downword from a lower surface of the upper case 401a and includes a second protrusion 311b and that faces the first protrusion 311a, and a second coupling part 313b formed on a second surface, such as a second side surface, opposite to the first surface of the secure element 241. The first and second protrusions 311a and 311b are formed of the same material as the upper case 401a and are integrally formed with the upper case 401a.

In an embodiment, the secure element 241 and the upper case 401a are integrally coupled by inserting the first protrusion 311a into the first coupling part 313a and by inserting the second protrusion 311b into the second coupling part 313b. For example, each of the first and second protrusions 311a and 311b have a hook structure, and each of the first and second coupling parts 313a and 313b have a groove structure that corresponds to a shape of each of the first and second protrusions 311a and 311b.

In some exemplary embodiments, shapes of the first and second protrusions 311a and 311b and the first and second coupling parts 313a and 313b are implemented such that the secure element 241 and the upper case 401a are initially easily coupled and a connection between the secure element 241 and the upper case 401a is maintained when the upper case 401a is removed. For example, in a cross-sectional view, each of the first and second protrusions 311a and 311b have a first side that is adjacent and relatively close to the upper case 401a and substantially parallel to the upper case 401a, and an inclined second side that extends from an end of the first side in a direction away from the upper case 401a to the respective first an second couplers 310a, 310b. Each of the first and second coupling parts 313a and 313b may have a shape that corresponds to each of the first and second protrusions 311a and 311b.

In some exemplary embodiments, the first and second protrusions 311a and 311b and the first and second coupling parts 313a and 313b have the above-described shapes, and the connection between the secure element 241 and the upper case 401a can be maintained even if the upper case 401a is removed. For example, when the upper case 401a is removed or separated as illustrated in FIG. 5, the secure element 241 is destroyed by separating the secure element 241 from the substrate 100 while the connection between the secure element 241 and the upper case 401a is maintained. For example, a coupling force between the secure element 241 and the upper case 401a by the first and second protrusions 311a and 311b and the first and second coupling parts 313a and 313b is stronger than a coupling force between the secure element 241 and the substrate 100 by the conductive bumps 250.

In some exemplary embodiments, when the secure element 241 is separated from the substrate 100, the secure element 241 is externally and internally destroyed. For example, in some embodiments, as will be described with reference to FIG. 30, the secure element 241 includes a memory cell array that stores data and peripheral circuits that drive the memory cell array. The internal destruction of the secure element 241 means that the memory cell array is destroyed or a connection between the memory cell array and the peripheral circuits is damaged. Thus, access to the secure element 241 using an external device is prevented.

Figure 6A:
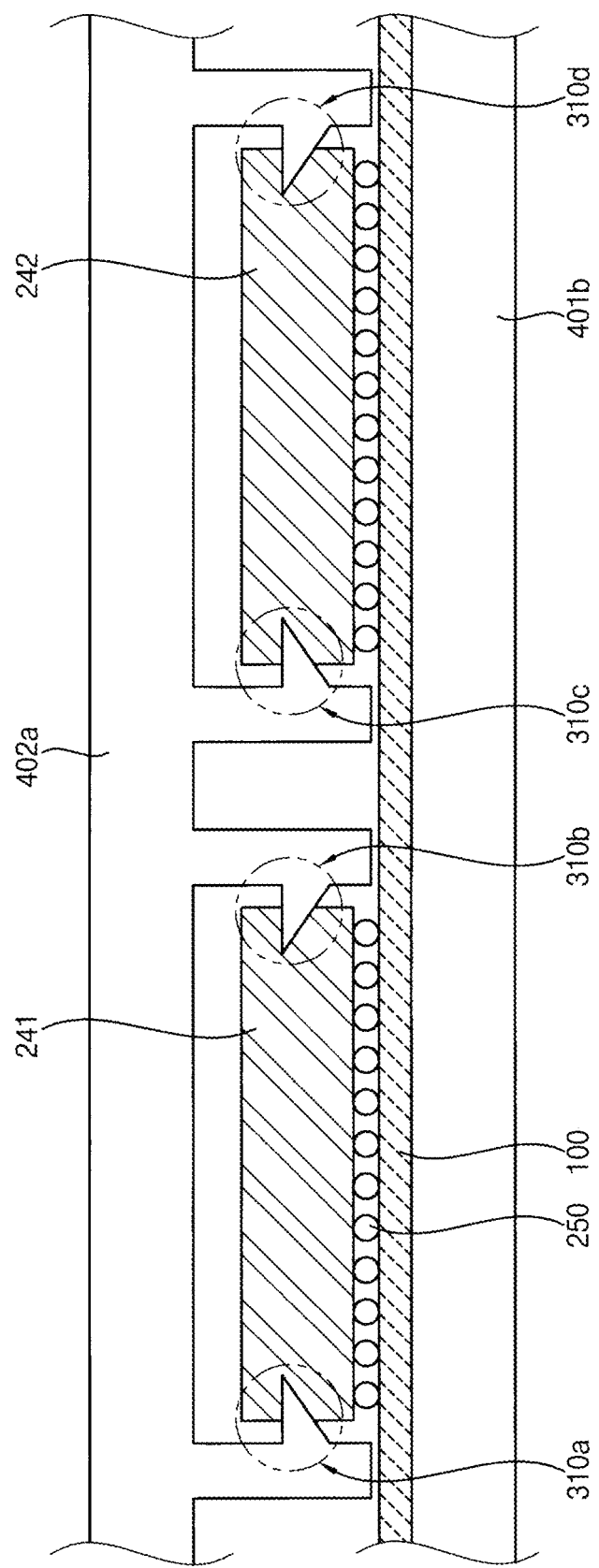
FIGS. 6A, 6B and 6C are cross-sectional views of another embodiment of a coupling structure included in the storage device of FIG. 1.
Figure 6B:
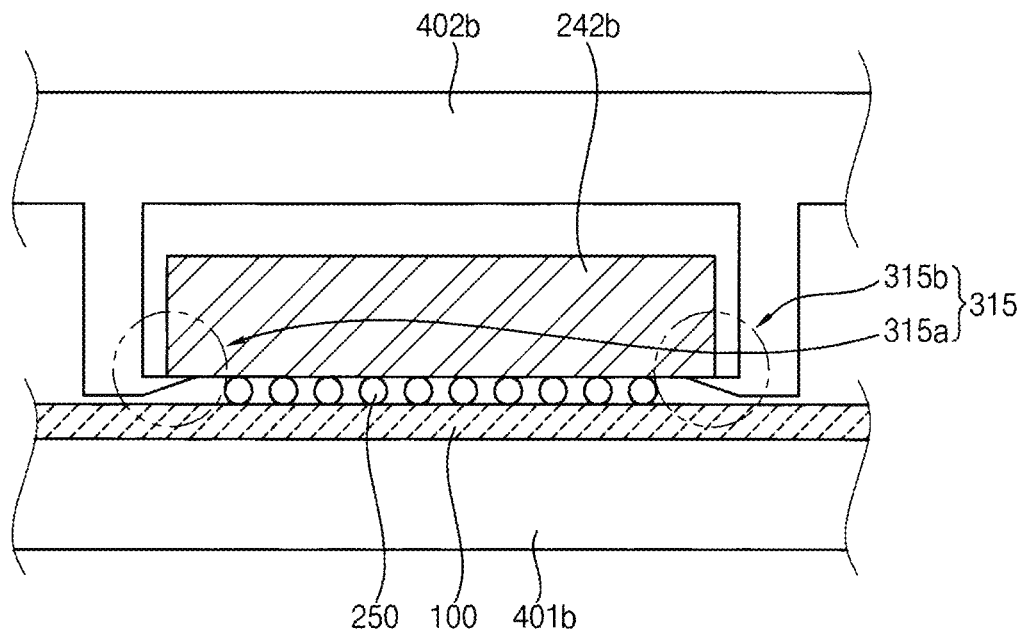
Figure 6C:
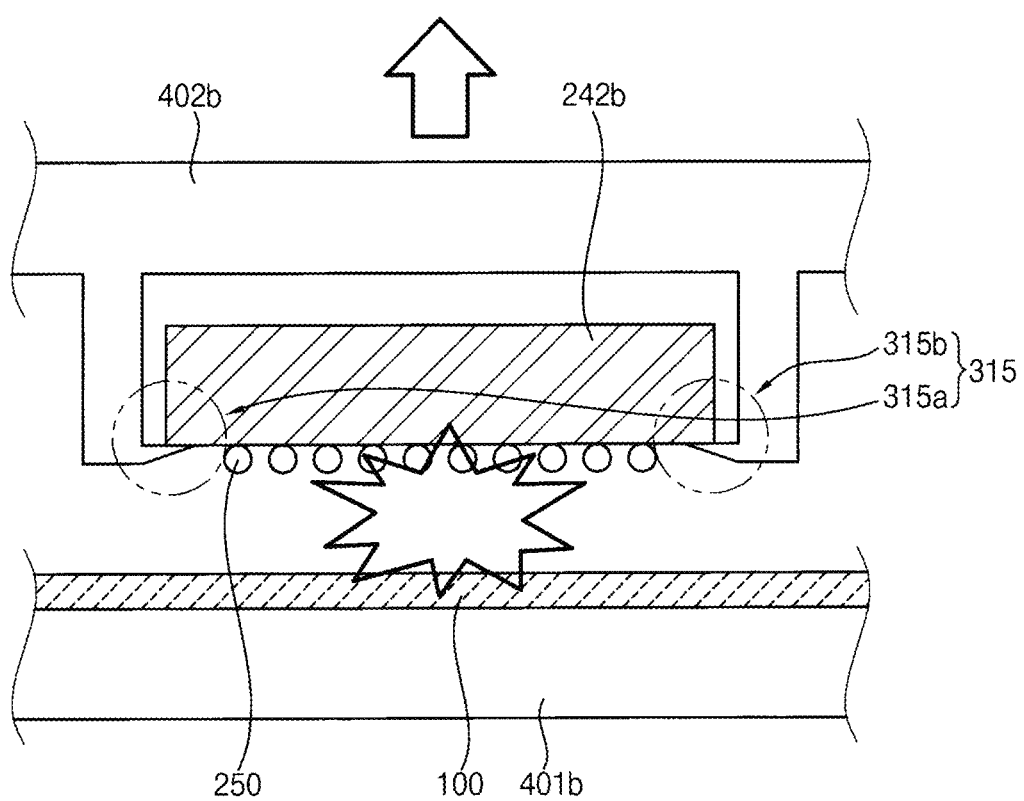

FIGS. 6A, 68 and 6C are cross-sectional views of another embodiment of a coupling structure included in the storage device of FIG. 1. Descriptions that repeat those given with respect to FIGS. 3, 4A, 4B and 5 will be omitted.

Referring to FIG. 6A, an embodiment of FIG. 6A is substantially the same as an embodiment of FIG. 3, except that an embodiment of FIG. 6A includes two secure elements 241 and 242.

In an embodiment, two secure elements 241 and 242 and an upper case 402a are integrally coupled by two coupling structures. The first coupling structure includes a first coupler 310a and a second coupler 310b that integrally couple the first secure element 241 and the upper case 402a, and the second coupling structure includes a third coupler 310c and a fourth coupler 310d that integrally couple the second secure element 242 and the upper case 402a. Each of the secure elements 241 and 242 in FIG. 6A is substantially the same as the secure element 241 in FIG. 3, each of the couplers 310a and 310c in FIG. 6A is substantially the same as the first coupler 310a in FIG. 3, and each of the couplers 310b and 310d in FIG. 6A is substantially the same as the second coupler 310b in FIG. 3.

In an embodiment, similar to that described with reference to FIG. 5, when the upper case 402a is removed or separated, the secure elements 241 and 242 are destroyed by separating the secure elements 241 and 242 from the substrate 100 while maintaining the connections between the secure elements 241 and 242 and the upper case 402a. In addition, the secure elements 241 and 242 are internally destroyed.

In an embodiment, when three or more secure elements are included in the storage device, the storage device includes the same number of coupling structures as the secure elements.

Referring to FIGS. 6B and 6C, in an embodiment, a secure element 242b and an upper case 402b are integrally coupled by a coupling structure 315. The coupling structure 315 includes a first coupler 315a and a second coupler 315b. The first coupler 315a extends downward from a lower surface of the upper case 402b and includes a first protrusion, and the second coupler 315b extends downword from a lower surface of the upper case 402b and includes a second protrusion that faces the first protrusion. The first and second protrusions in FIG. 6B are similar to the first and second protrusions 311a and 311b in FIG. 4A Unlike the example of FIGS. 3, 4A, 4B and 5, in an embodiment of FIGS. 6B and 6C, no first and second coupling parts that correspond to the first and second protrusions are formed on the secure element 242b. Instead, the first and second protrusions are in direct contact with a lower surface of the secure element 242b on which the conductive bumps 250 are disposed, and thus the secure element 242b and the upper case 402b are integrally coupled. Accordingly, exemplary embodiments can be incorporated without changing a structure of the secure element 242b.

For example, in an embodiment, when the upper case 402b is removed or separated as illustrated in FIG. 6C, the secure element 242b as destroyed by separating the secure element 242b from the substrate 100 even though the coupling structure maintains a connection between the secure element 242b and the upper case 402b. In addition, the secure element 242b is internally destroyed.

FIGS. 7, 8A, 8B and 9 are cross-sectional views of still another embodiment of a coupling structure included in the storage device of FIG. 1. Descriptions that repeat those given with respect to FIGS. 3, 4A, 4B and 5 will be omitted.

Figure 7:
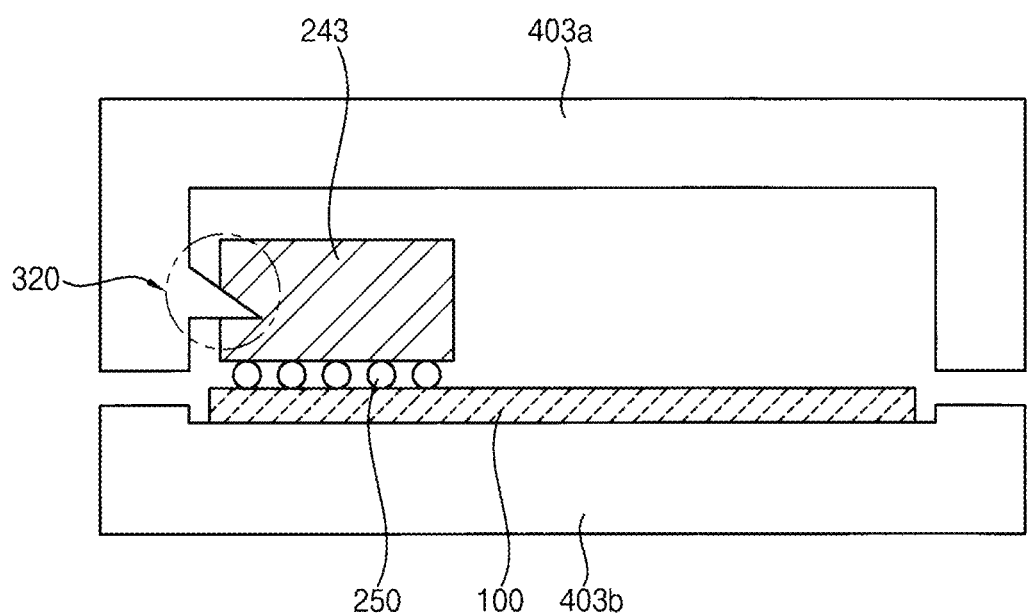
FIGS. 7, 8A, 8B and 9 are cross-sectional views of another embodiment of a coupling structure included in the storage device of FIG. 1.
Figure 8A:
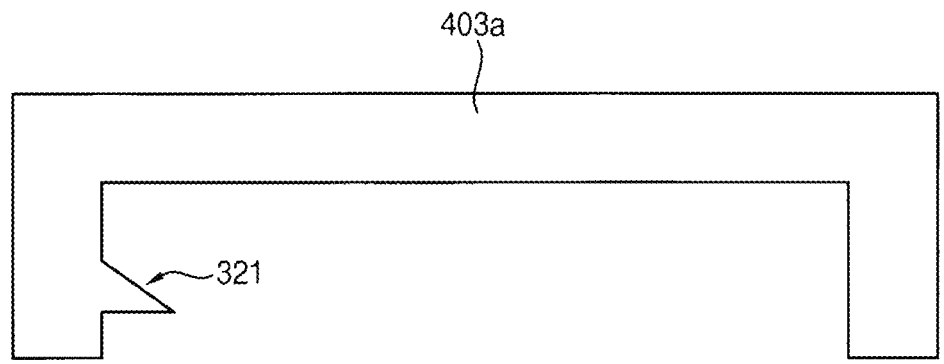
Figure 8B:
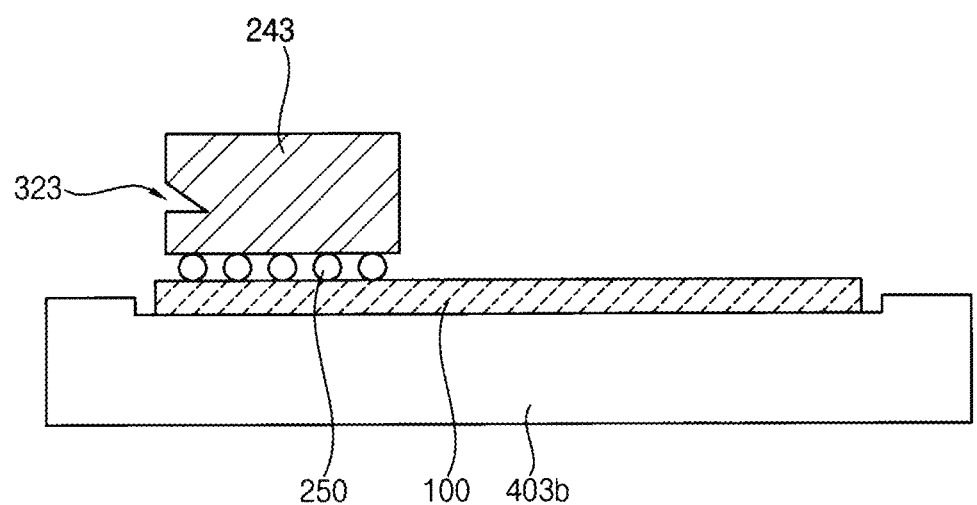
Figure 9:
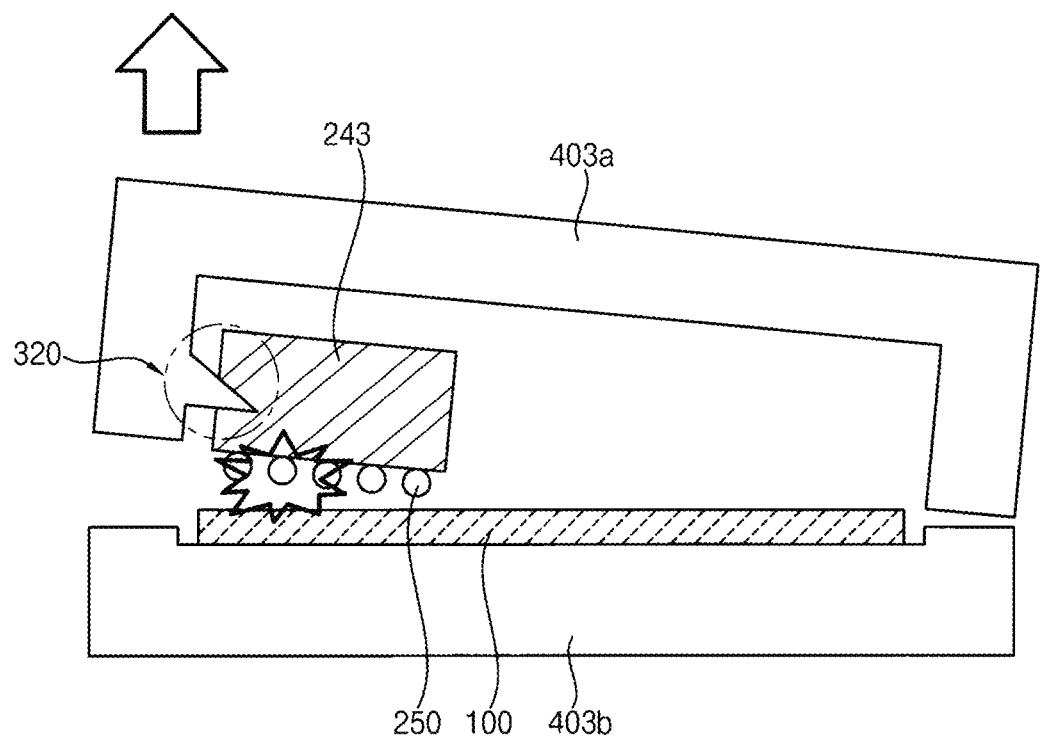

FIG. 7 illustrates an embodiment in which a secure element 243 and an upper case 403a are integrally coupled by a coupling structure 320. FIG. 8A illustrates the upper case 403a before being coupled with the secure element 243, and FIG. 8B illustrates the secure element 243 before being coupled with the upper case 403a. FIG. 9 illustrates the upper case 403a being removed or separated after the secure element 243 and the upper case 403a have been integrally coupled by the coupling structure 320.

Referring to FIGS. 7, 8A, 8B and 9, in an embodiment, the substrate 100 is mounted and fixed on a lower case 403b. The secure element 243 is mounted on the substrate 100 via the conductive bumps 250. The secure element 243 and an upper case 403a are integrally coupled by a coupling structure 320.

In an embodiment, the coupling structure 320 extends downword from a lower surface of the upper case 403a and includes a first protrusion 321, and a first coupling part 323 formed on a first side, such as a first side surface, of the secure element 243. Unlike the coupling structure 310 in FIG. 3 that includes two protrusions 311a and 311b and two coupling parts 313a and 313b, the coupling structure 320 in FIG. 7 includes one protrusion 321 and one coupling part 323. The first protrusion 321 is formed of the same material as the coupling structure 320 and the upper case 403a and is integrally formed with the coupling structure 320 and the upper case 403a. The secure element 243 and the upper case 403a are integrally coupled by inserting the first protrusion 321 into the first coupling part 323.

In some exemplary embodiments, shapes of the first protrusion 321 and the first coupling part 323 are implemented such that the secure element 243 and the upper case 403a are initially easily coupled and a connection between the secure element 243 and the upper case 403a can be maintained when the upper case 403a is removed. For example, in a cross-sectional view, unlike the protrusions 311a and 311b in FIG. 3, the first protrusion 321 has a first side that is relatively far apart from the upper case 403a and substantially parallel to the upper case 403a, and an inclined second side closer to the upper case 403a than the first side and that extends from an end of the first side toward the upper case 403a. The first coupling part 323 has a shape that corresponds to the first protrusion 321.

In an embodiment, since the first protrusion 321 and the first coupling part 323 have the above-described shapes, when the upper case 403a is removed, the secure element 243 is easily destroyed while the connection between the secure element 243 and the upper case 403a is maintained.

For example, when the upper case 403a is removed or separated, as illustrated in FIG. 9, the secure element 243 is destroyed by separating the secure element 243 from the substrate 100 based on the lever principle while the connection between the secure element 243 and the upper case 403a is maintained. For example, a coupling between the secure element 243 and the upper case 403a by the first protrusion 321 and the first coupling part 323 is stronger than a coupling force between the secure element 243 and the substrate 100 by the conductive bumps 250.

In some exemplary embodiments, when the secure element 243 is separated from the substrate 100, the secure element 243 is internally destroyed, and thus access to the secure element 243 using an external device is prevented.

Figure 10:
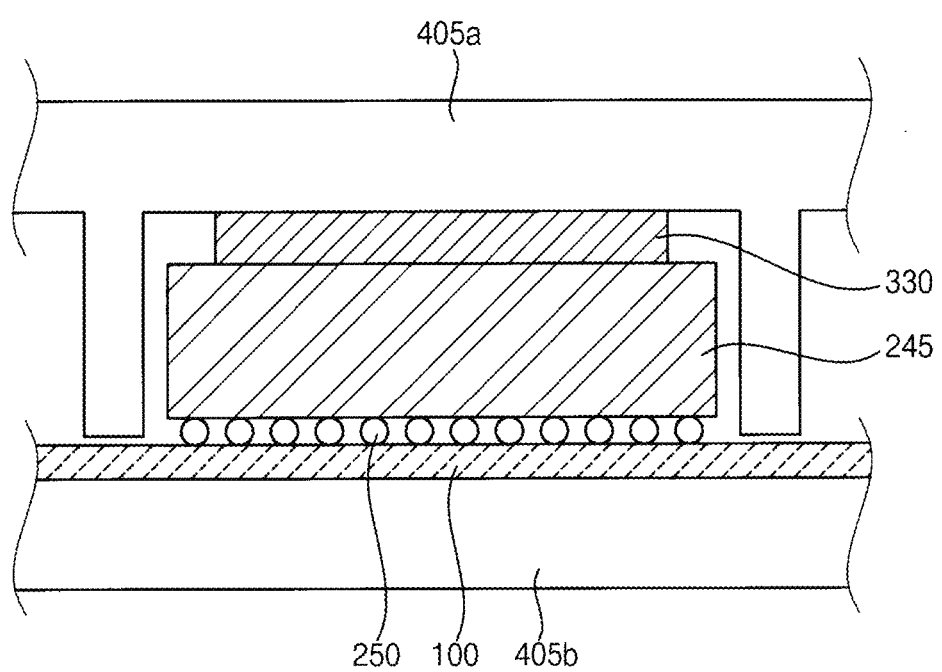
FIGS. 10 and 11 are cross-sectional views of another embodiment of a coupling structure included in the storage device of FIG. 1.
Figure 11:
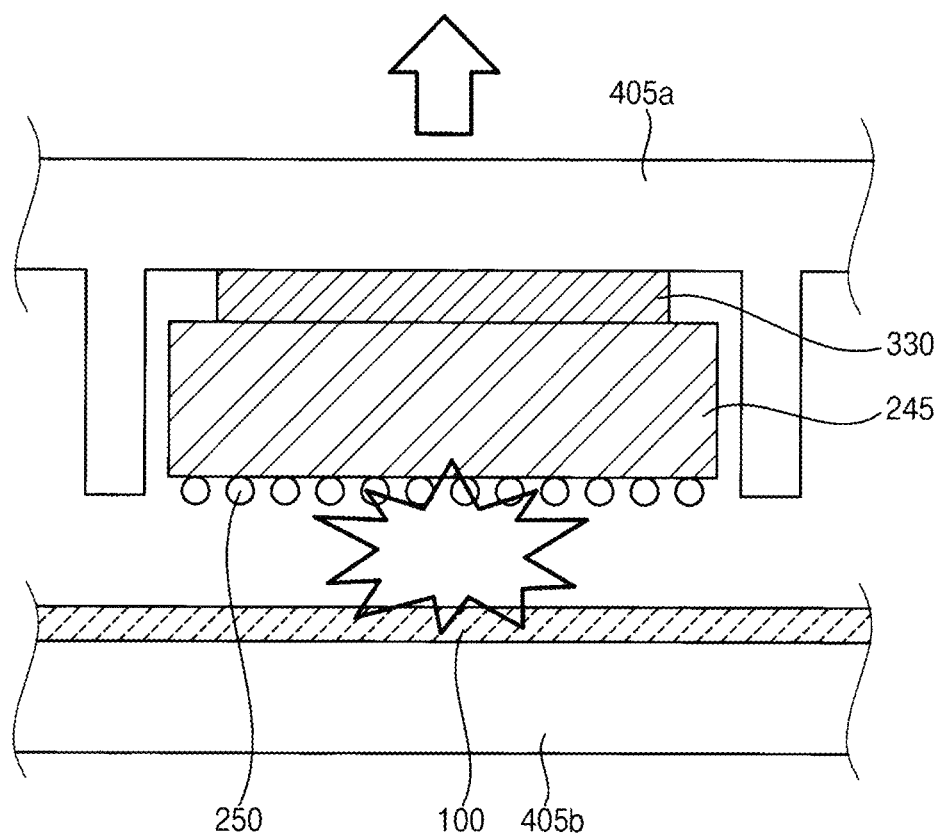

FIGS. 10 and 11 are cross-sectional views of another embodiment of a coupling structure included in the storage device of FIG. 1. Descriptions that repeat those given with respect to FIGS. 3, 4A, 4B and 5 will be omitted.

FIG. 10 illustrates an embodiment in which a secure element 245 and an upper case 405a are integrally coupled by a coupling structure 330. FIG. 11 illustrates the upper case 405a being removed or separated after the secure element 245 and the upper case 405a have been integrally coupled by the coupling structure 330.

Referring to FIGS. 10 and 11, in an embodiment, the substrate 100 is mounted and fixed on a lower case 405b. The secure element 245 is mounted on the substrata 100 via the conductive bumps 250. The secure element 245 and the upper case 405a are integrally coupled by the coupling structure 330.

In an embodiment, the coupling structure 330 includes an adhesive layer disposed between the secure element 245 and the upper case 405a. For example, the adhesive layer may be one of a viscous tape or a bonding product that has liquid or solid state, etc. The coupling structure 330 is an individual structure formed separately from the upper case 405a and attached to the upper case 405a, and is formed of a material that differs from that of the upper case 405a.

In an embodiment, the secure element 245 and the upper case 405a are integrally coupled by attaching the secure element 245 to the upper case 405a by the coupling, structure 330, such as the adhesive layer. For example, when the storage device is assembled, the adhesive layer may be formed on the upper case 405a to be bonded to the secure element 245, or the adhesive layer may be formed on the secure element 245 to be bonded to the upper case 405a. For another example, the adhesive layers may be formed on both the upper case 405a and the secure element 245 to be bonded to each other, and the coupling structure 330 may include two adhesive layers.

In an embodiment, when the upper case 405a is removed or separated as illustrated in FIG. 11, the secure element 245 is destroyed by separating the secure element 245 from the substrate 100 while the adhesive layer maintains as state in which the secure element 245 is attached to the upper case 405a. For example, a coupling force between the secure element 245 and the upper case 405a by the adhesive layer is stronger than a coupling force between the secure element 245 and the substrate 100 by the conductive bumps 250.

In some exemplary embodiments, when the secure element 245 is separated from the substrate 100, the secure element 245 is internally destroyed, and thus access to the secure element 245 using an external device is prevented.

FIGS. 12, 13, 14 and 15 are cross-sectional views of still another embodiment of a coupling structure included in the storage device of FIG. 1. Descriptions that repeat those given with respect to FIGS. 3, 4A, 4B, 5, 10 and 11 will be omitted.

Figure 12:
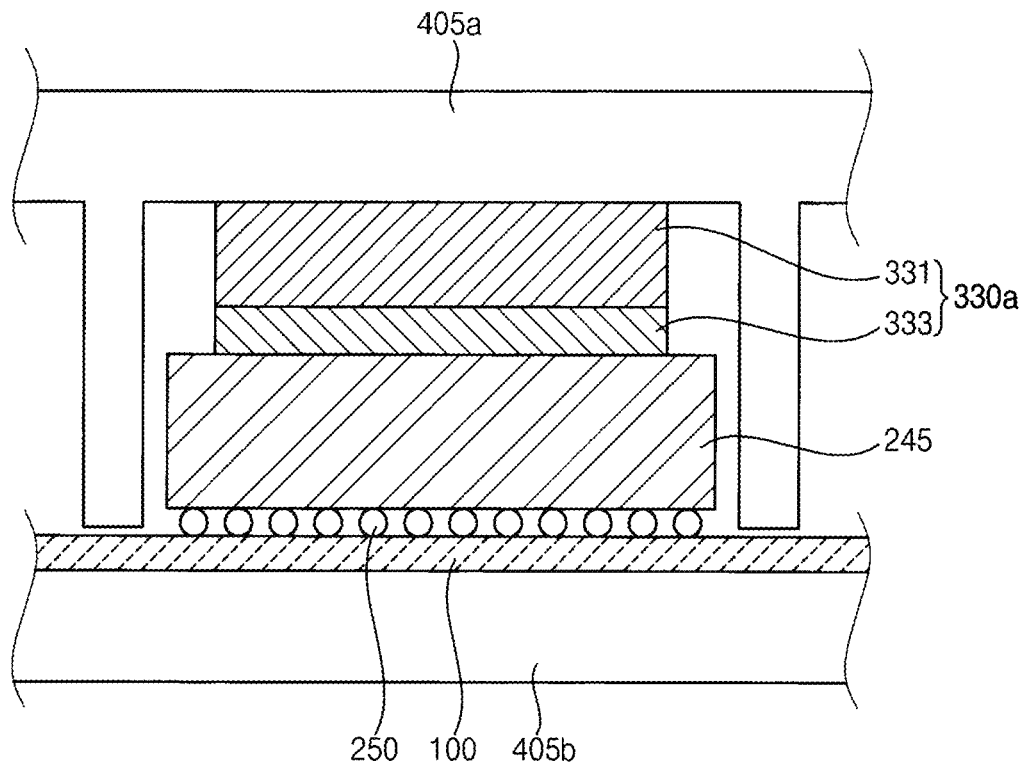
FIGS. 12, 13, 14 and 15 are cross-sectional views of another embodiment of a coupling structure included in the storage device of FIG. 1.
Figure 13:
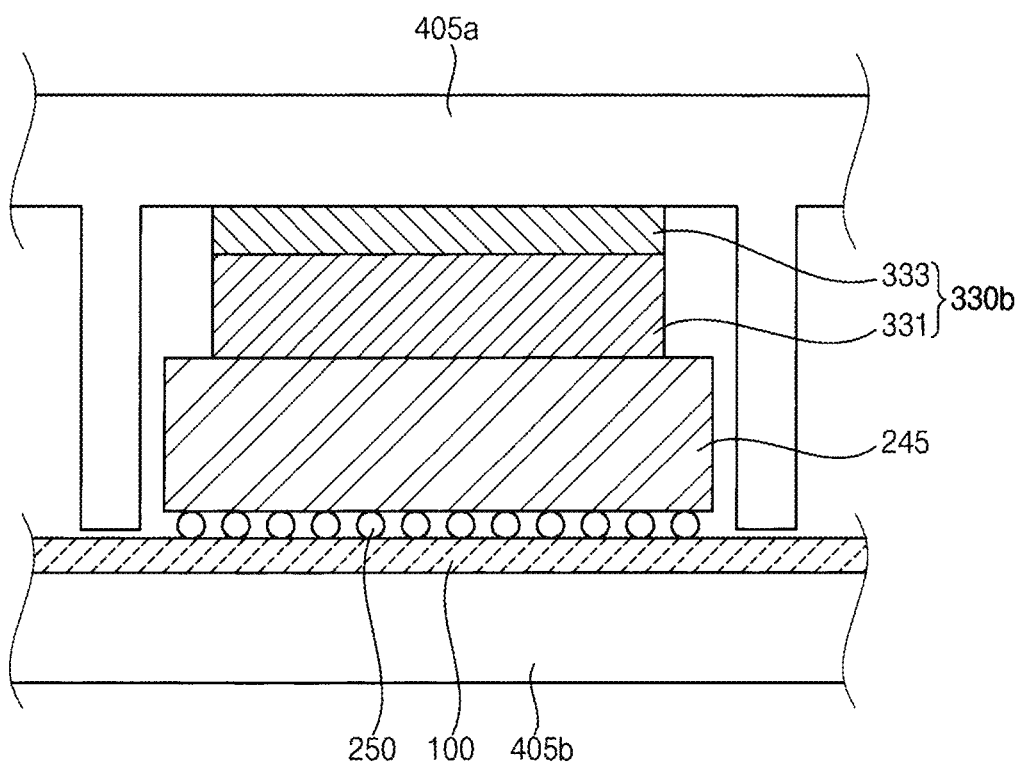

Referring to FIGS. 12 and 13, embodiments of FIGS. 12 and 13 are substantially the same as an embodiment of FIG. 10, except that embodiments of FIGS. 12 and 13 include coupling structures 330a and 330b that include an adhesive layer 331 and a heat dissipation layer 333.

In an embodiment of FIG. 12, the heat dissipation layer 333 is interposed between it) the secure element 245 and the adhesive layer 331. In an embodiment of FIG. 13, the heat dissipation layer 333 is interposed between the upper case 405a and the adhesive layer 331. By adding the heat dissipation layer 333, heat dissipation from the secure element 245 is improved or enhanced.

Figure 14:
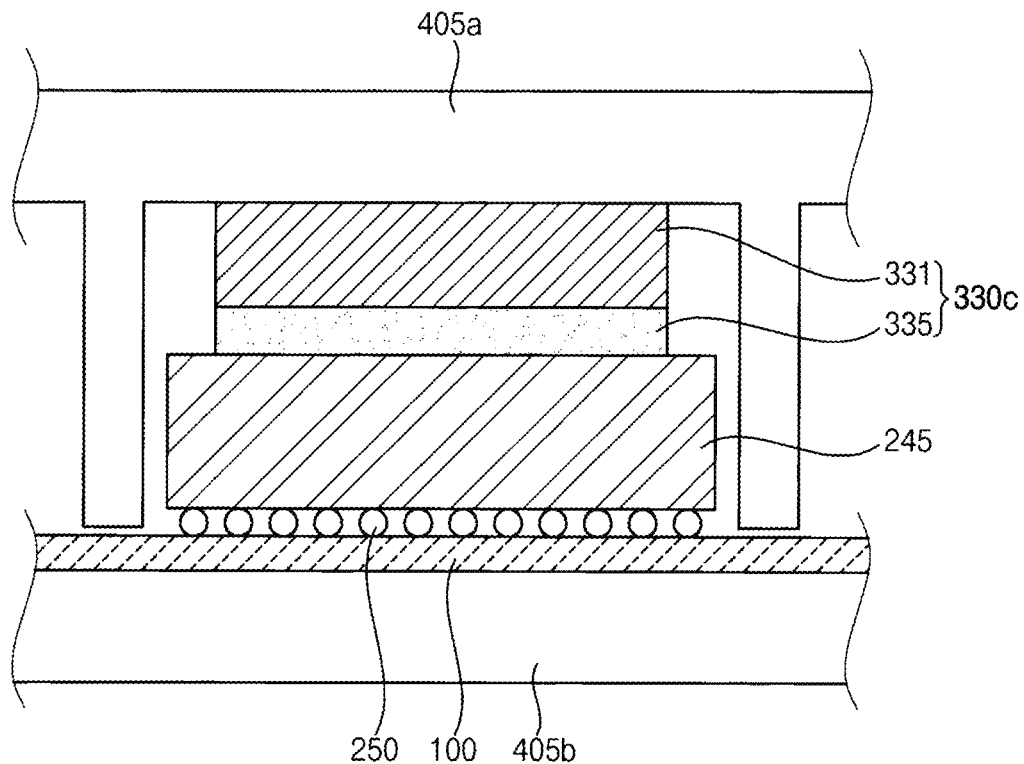
Figure 15:
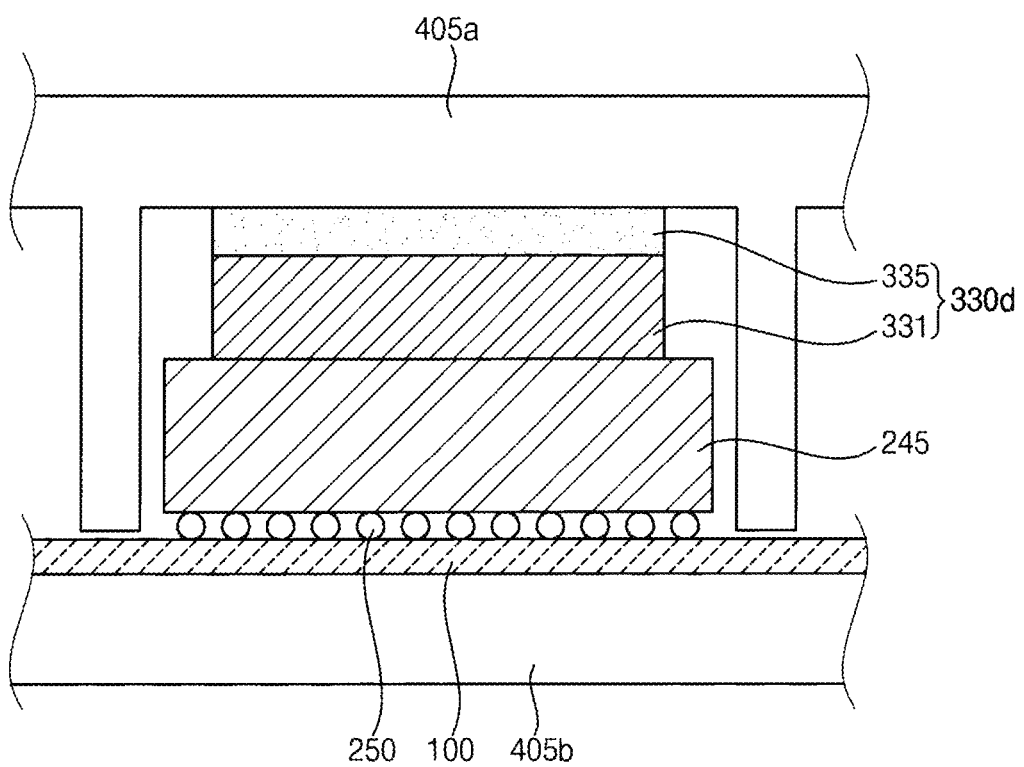

Referring to FIGS. 14 and 15, embodiments of FIGS. 14 and 15 are substantially the same as an embodiment of FIG. 10, except that embodiments of FIGS. 14 and 15 include coupling structures 330c and 330d that include the adhesive layer 331 and an electrostatic discharge (ESD) protection layer 335.

In an embodiment of FIG. 14, the ESD protection layer 335 is interposed between the secure element 245 and the adhesive layer 331. In an embodiment of FIG. 15, the ESD protection layer 335 is interposed between the upper case 405a and the adhesive layer 331. For example, the ESD protection layer 335 includes a conductive tape. By adding the (ESD) protection layer 335, electrical characteristics of the secure element 245 are improved or enhanced.

In some exemplary embodiments, the coupling structure includes all of the adhesive layer 331, the heat dissipation layer 333 and the ESD protection layer 335.

In some embodiments, when the adhesive layers are formed on both the upper case 405a and the secure element 245 to be bonded to each other, the heat dissipation layer 333 or the ESD protection layer 335 are interposed between the two adhesive layers.

Although FIGS. 12, 13, 14 and 15 illustrate that a size of the heat dissipation layer 333 and a size of the ESD protection layer 335 are substantially the same as that of the adhesive layer 331, exemplary embodiments are not limited thereto. For example, in some embodiments, the size of the heat dissipation layer 333 and the size of the ESD protection layer 335 is less than that of the adhesive layer 331. In other embodiments, the heat dissipation layer 333 and the ESD protection layer 335 include at least one heat dissipation pad and at least one ESD pad, respectively.

Figure 16:
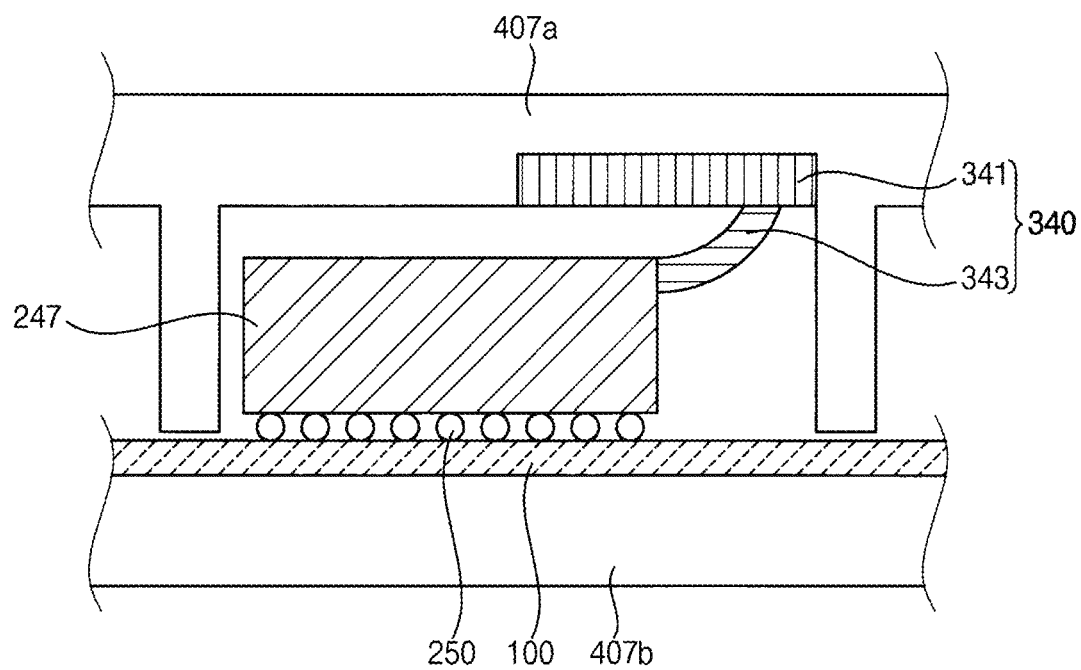
FIGS. 16 and 17 are cross-sectional views of another embodiment of a coupling structure included in the storage device of FIG. 1.
Figure 17:
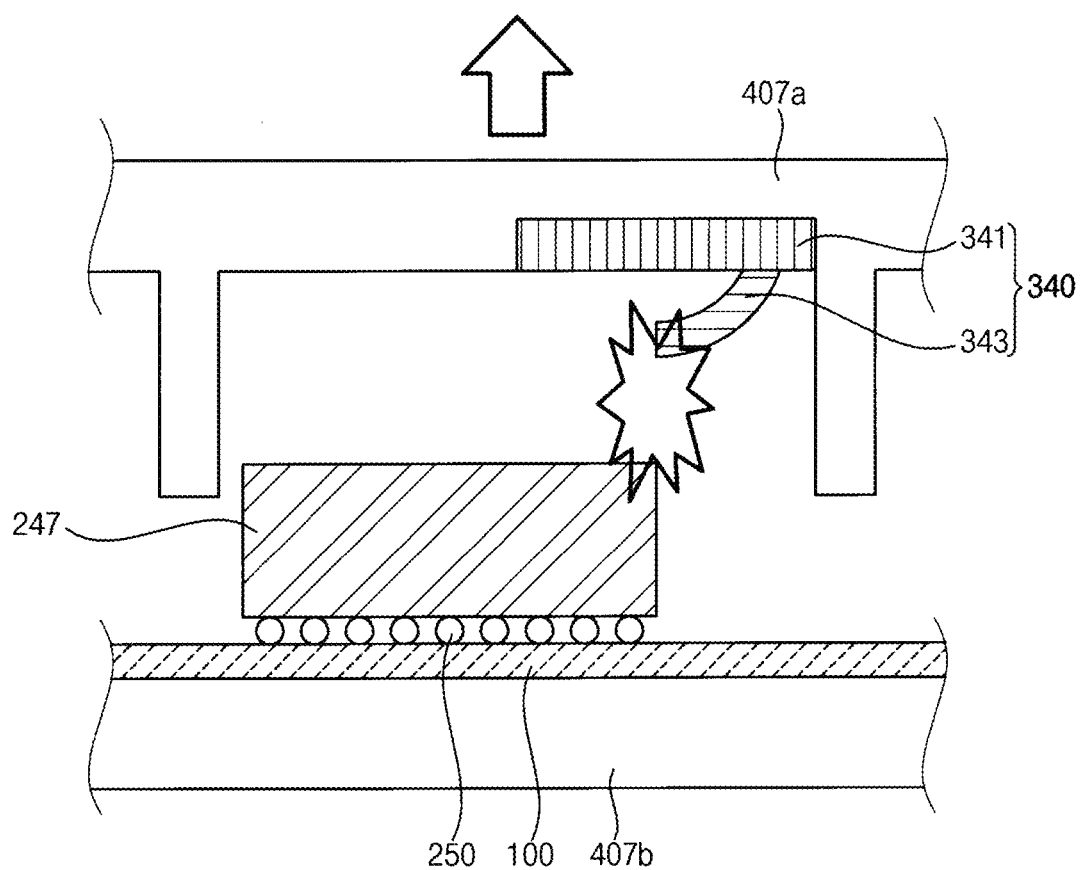

FIGS. 16 and 17 are cross-sectional views of another embodiment of a coupling structure included in the storage device of FIG. 1. Descriptions that repeat those given with respect to FIGS. 3, 4A, 4B and 5 will be omitted.

FIG. 16 illustrates an embodiment in which a secure element 247 and an upper case 407a are integrally coupled by a coupling structure 340. FIG. 17 illustrates the upper case 407a being removed or separated after the secure element 247 and the upper case 407a have been integrally coupled by the coupling structure 340.

Referring to FIGS. 16 and 17, in an embodiment, the substrate 100 is mounted and fixed on a lower case 407b. The secure element 247 is mounted on the substrate 100 via the conductive bumps 250. The secure element 247 and the upper case 407a are integrally coupled by the coupling structure 340.

In an embodiment, the coupling, structure 340 includes an electrical material disposed between the secure element 247 and the upper case 407a. For example, the electrical material is a flexible printed circuit hoard (FPCB) 343 electrically connected to the secure element 247, and an FPCB connector 341 formed in the upper case 407a to which the flexible printed circuit board (FPCB) 343 is connected. The coupling structure 340 is formed separately from the upper case 407a and attached to the upper case 407a, and is formed of a material that differs from that of the upper case 407a. Since the coupling structure 340 includes an electrical material that forms an electrical connection, the electrical performance for the secure element 247 is improved or enhanced.

In an embodiment, the secure element 247 and the upper case 407a are integrally coupled by connecting the secure element 247 to the upper case 407a by the coupling structure 340. For example, the upper case 407a includes the FPCB connector 341, and the secure element 247 includes the FPCB 343. When the storage device is assembled, the FPCB 343 is inserted into the FPCB connector 341 to bond the secure element 247 with the upper case 407a.

For example, in an embodiment, when the upper case 407a is removed or separated, as illustrated in FIG. 17, the secure element 247 is essentially destroyed by damaging at least a part of the FPCB 343. However, exemplary embodiments are not limited thereto, and in other embodiments, at least a part of the FPCB connector 341 is damaged, or the secure element 247 is separated from the substrate 100 while a connection between the FPCB connector 341 and the FPCB 343 is maintained.

In some exemplary embodiments, when at least the part of the FPCB 343 is damaged, the secure element 247 is internally destroyed, and thus access to the secure element 247 using an external device is prevented.

Figure 18:
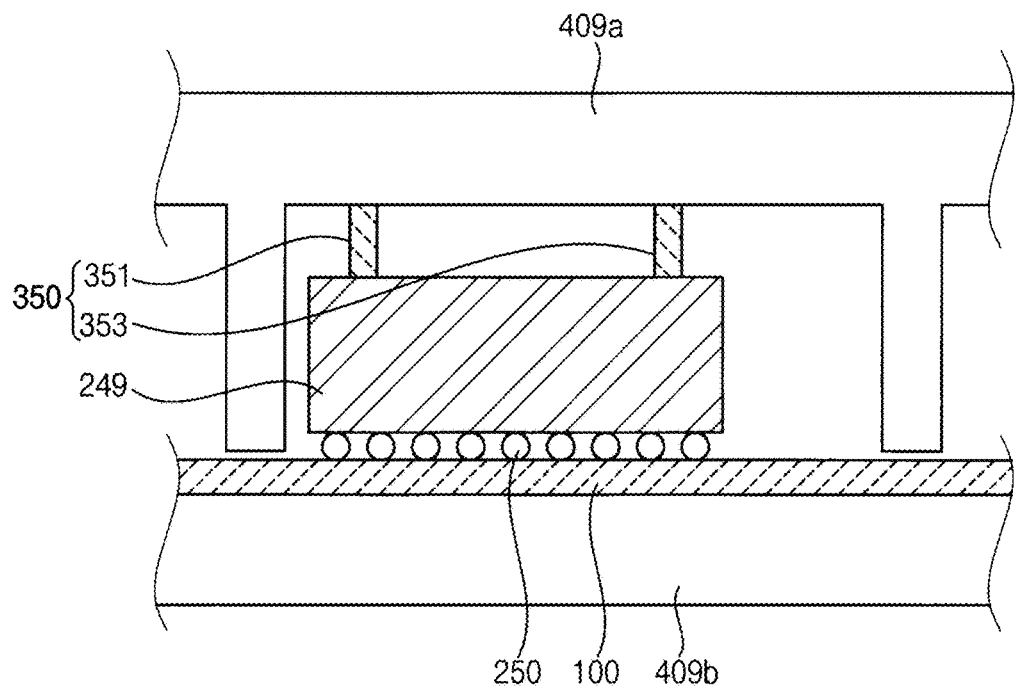
FIGS. 18 and 19 are cross-sectional views of another embodiment of a coupling structure included in the storage device of FIG. 1.
Figure 19:
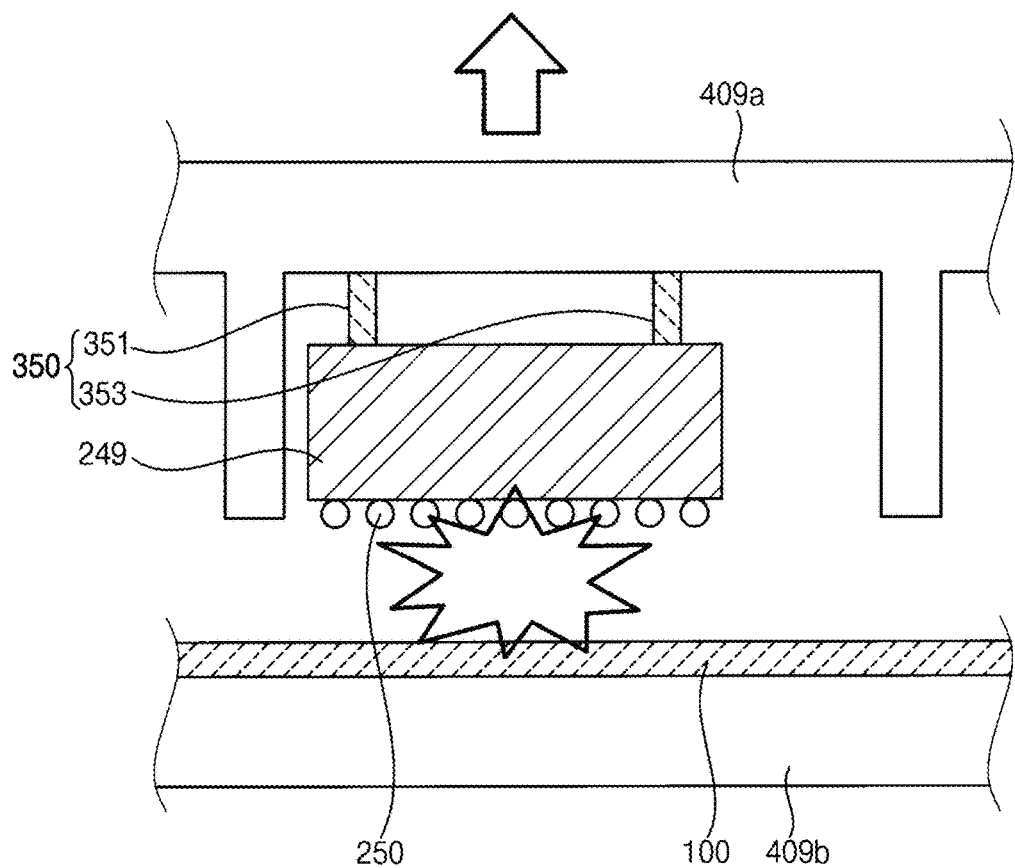

FIGS. 18 and 19 are cross-sectional views of still another embodiment of a coupling structure included in the storage device of FIG. 1. Descriptions that repeat those given with respect to FIGS. 3, 4A, 4B and 5 will be omitted.

FIG. 18 illustrates an embodiment in which a secure element 249 and an upper case 409a are integrally coupled by a coupling structure 350. FIG. 18 illustrates the upper case 409a being removed or separated after the secure element 249 and the upper case 409a has been integrally coupled by the coupling structure 350.

Referring to FIGS. 18 and 19, in an embodiment, the substrate 100 is mounted and fixed on a lower case 409b. The secure element 249 is mounted on the substrate 100 via the conductive bumps 250. The secure element 249 and the upper case 409a are integrally coupled by the coupling structure 350.

In an embodiment, the coupling structure 350 includes an electrical material disposed between the secure element 249 and the upper case 409a. For example, the electrical material includes at least one conductive wire 351 or 353. For example, the conductive wires 351 and 353 include at least one metal. The coupling structure 350 is formed separately from the upper case 409a and attached to the upper case 409a, and includes a material that differs from that of the upper case 409a. Since the coupling structure 350 includes an electrical material that forms an electrical connection, an electrical performance of the secure element 249 is improved or enhanced.

In an embodiment, the secure element 249 and the upper case 409a are integrally coupled by connecting the secure element 249 to the upper case 409a by the coupling structure 350, i.e. by the conductive wires 351 and 353).

In an embodiment, when the upper case 409a is removed or separated as illustrated in FIG. 19, the secure element 249 is destroyed by separating the secure element 249 from the substrate 100 while the secure element 249 remains connected to the upper case 409a by the conductive wires 351 and 353. For example, a coupling force between the secure element 249 and the upper case 409*a* by the conductive wires 351 and 353 is stronger than a coupling force between the secure element 249 and the substrate 100 by the conductive bumps 250.

In some exemplary embodiments, when the secure element 249 is separated from the substrate 100, the secure element 249 is internally destroyed, and thus access to the secure element 249 using an external device is prevented.

In some exemplary embodiments, as with that described with reference to FIG. 6A, when two or more secure elements are included in the storage device, the storage device includes the same number of coupling structures as the secure elements.

In some exemplary embodiments, when two or more secure elements are included in the storage device, the storage device may be implemented by combining two or more embodiments described with reference to FIGS. 3 through 19.

FIGS. 20, 21A, 21B and 22 are cross-sectional views of an embodiment of a coupling structure and a connection between a secure element and a substrate included in the storage device of FIG. 1. Descriptions that repeat those given with respect to FIGS. 3, 4A, 4B and 5 will be omitted.

Figure 20:
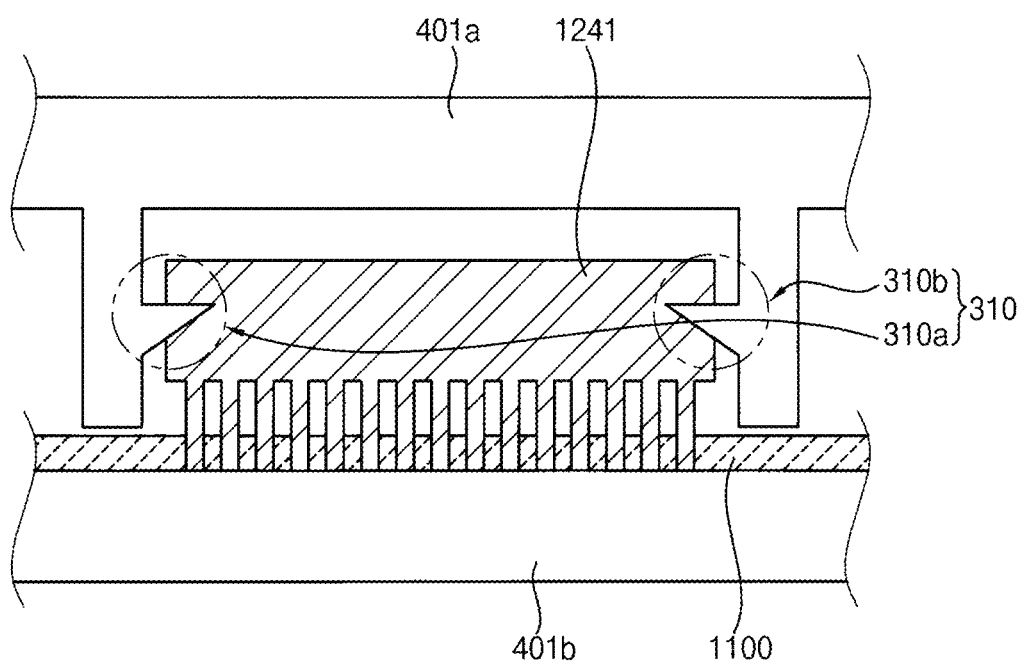
FIGS. 20, 21A, 21B and 22 are cross-sectional views of an embodiment of a coupling structure and a connection between a secure element and a substrate included in the storage device of FIG. 1.
Figure 21A:
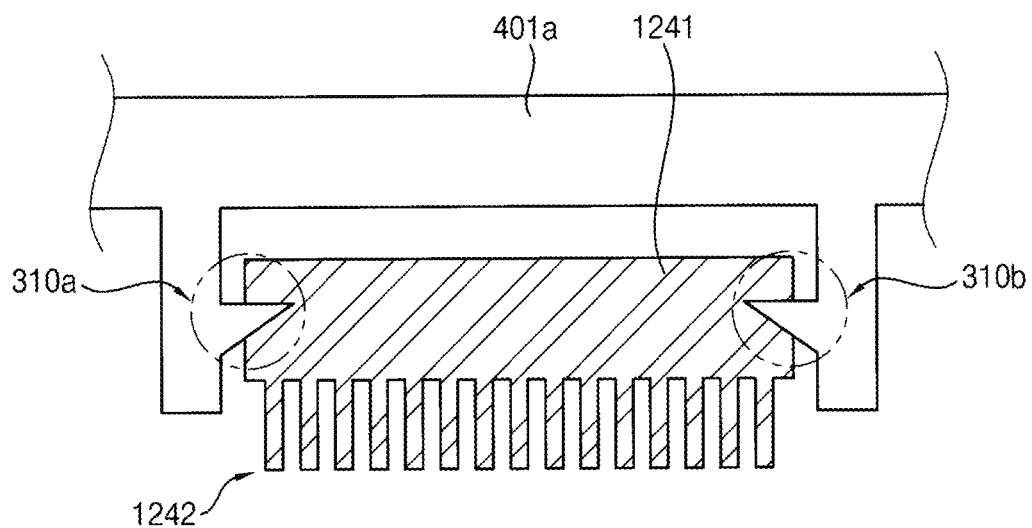
Figure 21B:
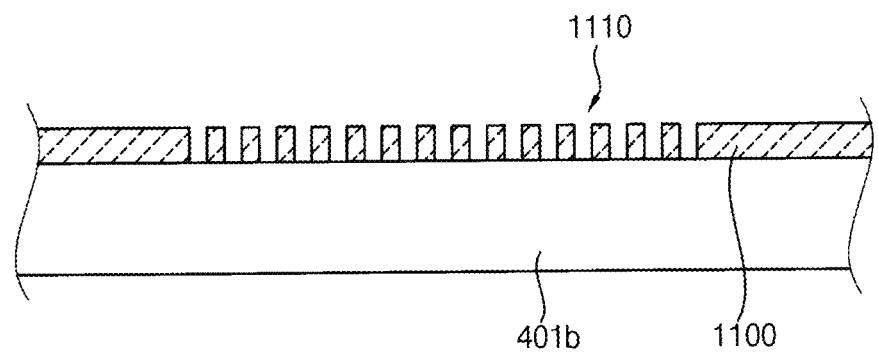
Figure 22:
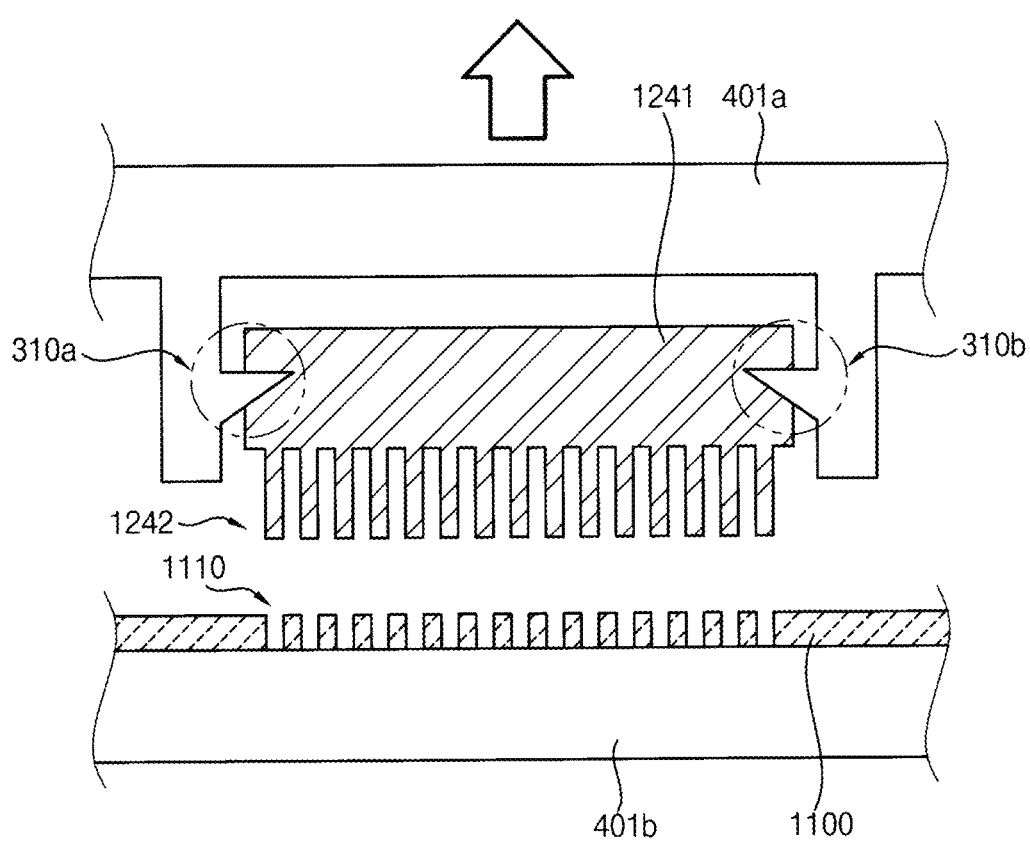

FIG. 20 illustrates an embodiment in which a secure element 1241 and the upper case 401*a* are integrally coupled by the coupling structure 310 and the secure element 1241 and a substrate 1100 are electrically connected. FIG. 21A illustrates the secure element 1241 before being electrically connected to the substrate 1100, and FIG. 21B illustrates the substrate 1100 before being electrically connected to the secure element 1241. FIG. 22 illustrates the secure element 1241 and the substrate 1100 being electrically disconnected or separated after the secure element 1241 and the substrate 1100 have been electrically connected.

Referring to FIGS. 20, 21A, 21B and 22, according to an embodiment, the upper case 401*a*, the lower case 401*b*, and the coupling structure 310 and couplers 310*a* and 310*b* are substantially the same as the upper case 401*a*, the lower case 401*b* and the coupling structure 310 and couplers 310*a* and 310*b* in FIGS. 3, 4A and 4B, respectively. In some exemplary embodiments, the coupling structure 310 is replaced with the coupling structure 315 described with reference to FIG. 6B.

In an embodiment, a plurality of electrical coupling parts 1110 are formed on the substrate 1100, and a plurality of electrical protrusions 1242 are formed in the secure element 1241. For example, the plurality of electrical coupling parts 1110 include a plurality of conductive holes, and the plurality of electrical protrusions 1242 include a plurality of lead frames formed on a lower surface of the secure element 1241. Unlike the example of FIG. 3 in which the secure element 241 and the substrate 100 are electrically connected by the conductive bumps 250, in an example of FIG. 20, the secure element 1241 and the substrate 1100 are electrically connected to each other by inserting the plurality of electrical protrusions 1242 into the plurality of electrical coupling parts 1110.

In an embodiment, as with the example of FIG. 5, the connection between the secure element 1241 and the upper case 401*a* is maintained even if the upper case 401*a* is removed. For example, when the upper case 401*a* is removed or separated as illustrated in FIG. 22, the secure element 1241 is separated and removed from the substrate 1100 while the connection between the secure element 1241 and the upper case 401*a* is maintained. For example, a coupling force between the secure element 1241 and the upper case 401*a* by the first and second protrusions 311*a* and 311*b* and the first and second coupling parts 313*a* and 313*b* may be stronger than a coupling force between the secure element 1241 and the substrate 1100 by the plurality of electrical coupling parts 1110 and the plurality of electrical protrusions 1242.

In an embodiment, after the secure element 1241 is separated and removed as described above, access to secure data stored in the secure element 1241 using the storage device is prevented. However, unlike the example of FIG. 5, the secure element 1241 is not destroyed when the secure element 1241 is separated and removed. For example, the secure element 1241 can be electrically connected to the substrate 1100 again after the secure element 1241 is separated and removed from the substrate 1100, after which access to the secure data stored in the secure element 1241 is restored.

Figure 23:
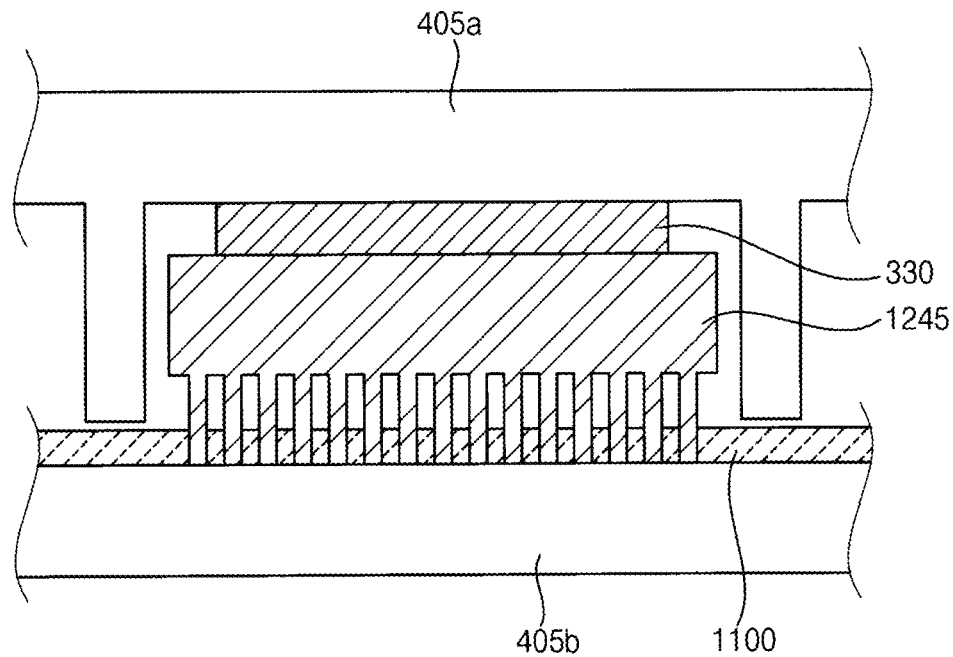
FIGS. 23 and 24 are cross-sectional views of another embodiment of a coupling structure and a connection between a secure element and a substrate included in the storage device of FIG. 1.
Figure 24:
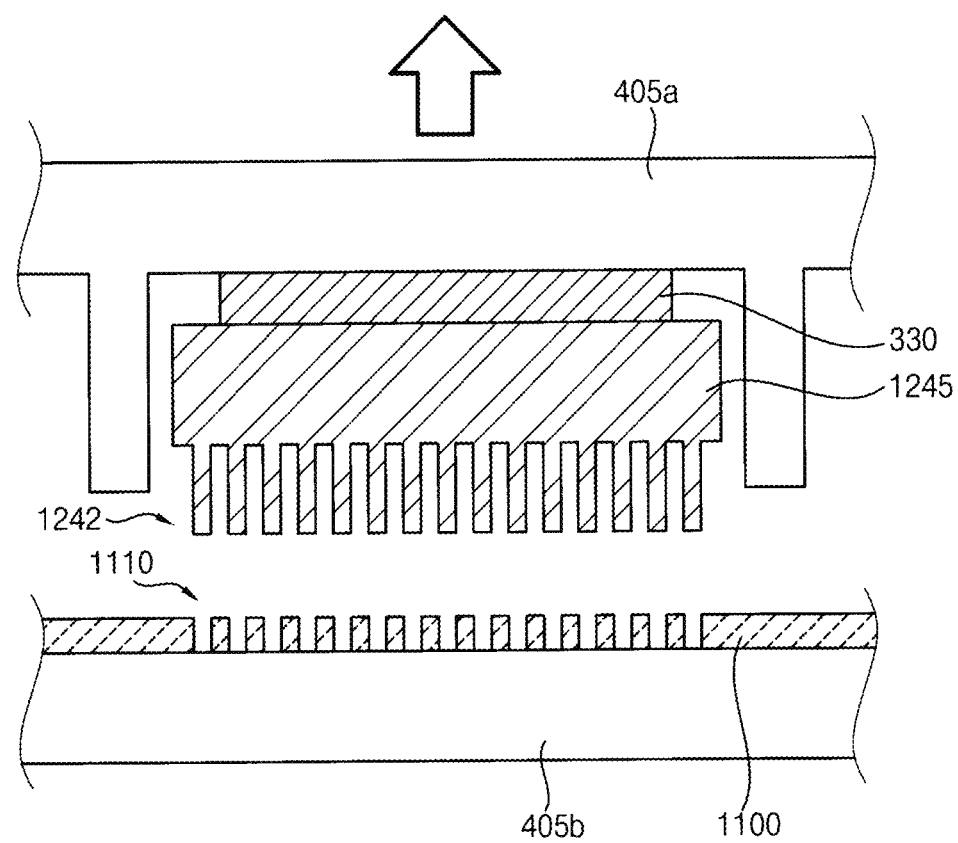

FIGS. 23 and 24 are cross-sectional views of another embodiment of a coupling structure and a connection between a secure element and a substrate included in the storage device of FIG. 1. Descriptions that repeat those given with respect to FIGS. 10, 11, 20, 21A, 21B and 22 will be omitted.

FIG. 23 illustrates an embodiment in which a secure element 1245 and the upper case 405*a* are integrally coupled by the coupling structure 330, and the secure element 1245 and the substrate 1100 are electrically connected. FIG. 24 illustrates the secure element 1245 and the substrate 1100 being electrically disconnected or separated after the secure element 1245 and the substrate 1100 have been electrically connected.

Referring to FIGS. 23 and 24, in an embodiment, the upper case 405*a*, the lower case 405*b* and the coupling structure 330 are substantially the same as the upper case 405*a*, the lower case 405*b* and the coupling structure 330 in FIG. 10, respectively. The secure element 1245 is substantially the same as the secure element 245 in FIG. 10, except that the secure element 1245 further includes the plurality of electrical protrusions 1242. The substrate 1100, the plurality of electrical coupling parts 1110 and the plurality of electrical protrusions 1242 are substantially the same as the substrate 1100, the plurality of electrical coupling 1110 and the plurality of electrical protrusions 1242 in FIGS. 20, 21A and 21B, respectively.

For example, in an embodiment, when the upper case 405*a* is removed or separated as illustrated in FIG. 24, the secure element 1245 is separated and removed from the substrate 1100 while the secure element 1245 remains attached to the upper case 405*a* by the adhesive layer. For example, a coupling force between the secure element 1245 and the upper case 405*a* by the adhesive layer is stronger than a coupling force between the secure element 1245 and the substrate 1100 by the plurality of electrical coupling parts 1110 and the plurality of electrical protrusions 1242. However, the secure element 1245 is not destroyed when the secure element 1245 is separated and removed, and access to secure data stored in the secure element 1245 is restored after the secure element 1245 is electrically connected to the substrate 1100 again.

In some exemplary embodiments, the coupling structure 330 further includes the heat dissipation layer 333 in FIGS. 12 and 13, or the ESD protection layer 335 in FIGS. 14 and 15.

Figure 25:
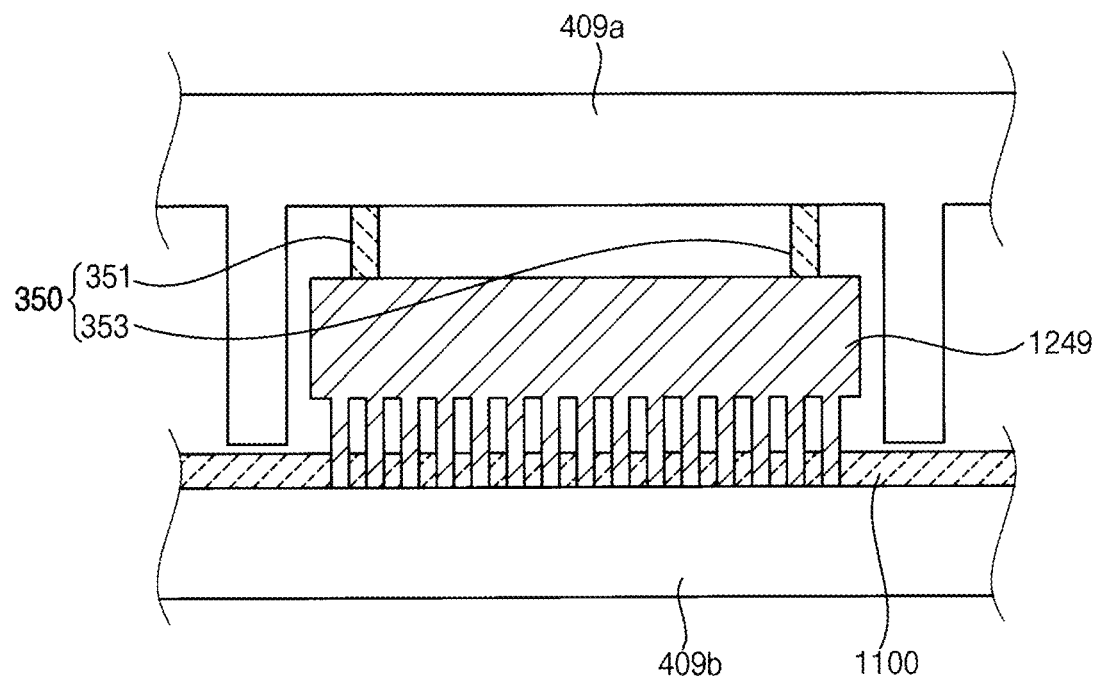
FIGS. 25 and 26 are cross-sectional views of another embodiment of a coupling structure and a connection between a secure element and a substrate included in the storage device of FIG. 1.
Figure 26:
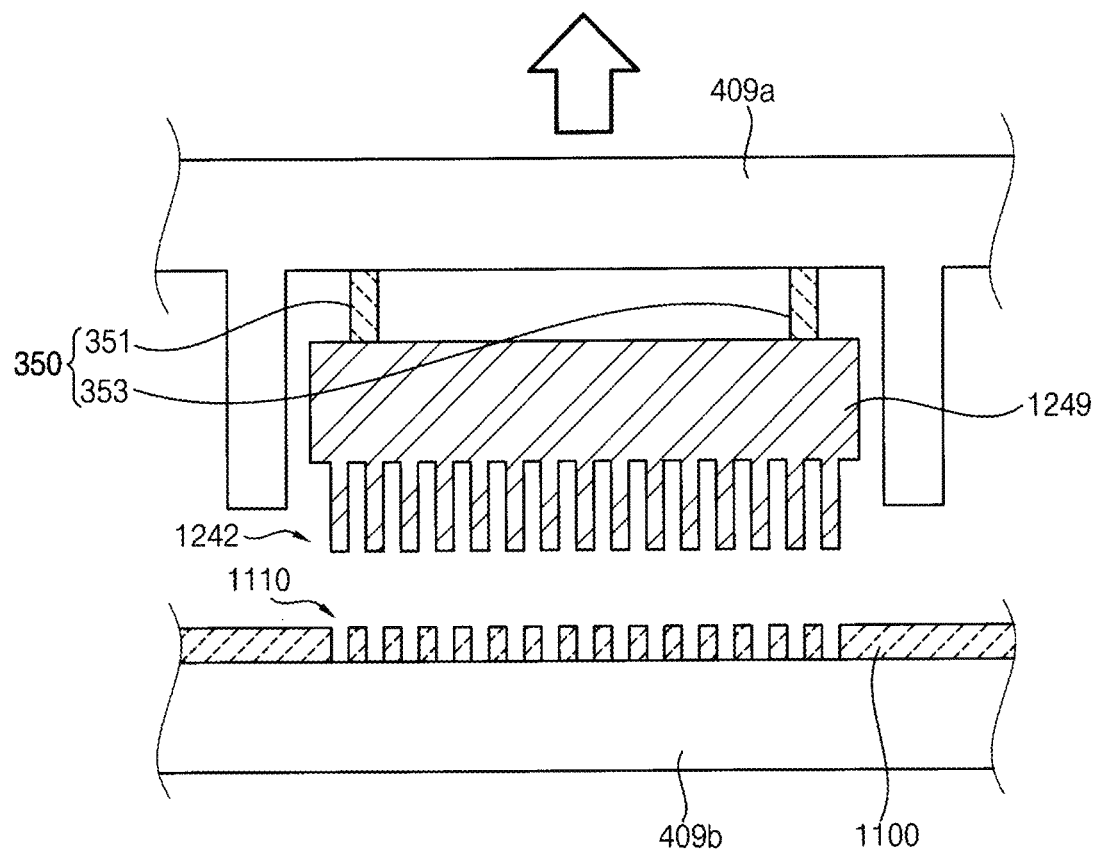

FIGS. 25 and 26 are cross-sectional views of another embodiment of a coupling structure and a connection between a secure element and a substrate included in the storage device of FIG. 1. Descriptions that repeat those given with respect to FIGS. 18, 19, 20, 21A, 21B and 22 will be omitted.

FIG. 25 illustrates an embodiment in which a secure element 1249 and the upper case 409a are integrally coupled by the coupling structure 350, and the secure element 1249 and the substrate 1100 are electrically connected. FIG. 26 illustrates the secure element 1249 and the substrate 1100 being electrically disconnected or separated after the secure element 1249 and the substrate 1100 have been electrically connected.

Referring to FIGS. 25 and 26, in an embodiment, the upper case 409a, the lower case 409b and the coupling structure 350 with conductive wires 351, 353 are substantially the same as the upper case 409a, the lower case 409b and the coupling structure 350 with conductive wires 351, 353 in FIG. 18, respectively. The secure element 1249 is substantially the same as the secure element 249 in FIG. 18, except that the secure element 1249 further includes the plurality of electrical protrusions 1242. The substrate 1100, the plurality of electrical coupling parts 1110 and the plurality of electrical protrusions 1242 are substantially the same as the substrate 1100, the plurality of electrical coupling parts 1110 and the plurality of electrical protrusions 1242 in FIGS. 20, 21A and 21B, respectively.

In an embodiment, the upper case 409a is removed or separated as illustrated in FIG. 26, the secure element 1249 is separated and removed from the substrate 1100 while the secure element 1249 remains connected to the upper case 409a by the conductive wires 351 and 353. For example, a coupling force between the secure element 1249 and the upper case 409a by the conductive wires 351 and 353 is stronger than a coupling force between the secure element 1249 and the substrate 1100 by the plurality of electrical coupling parts 1110 and the plurality of electrical protrusions 1242. However, the secure element 1249 is not destroyed when the secure element 1249 is separated and removed, and access to secure data stored in the secure element 1249 is restored after the secure element 1249 is electrically connected to the substrate 1100 again.

In some exemplary embodiments, when two or more secure elements are included in the storage device, the storage device includes the same number of coupling structures as the secure elements.

In some exemplary embodiments, when two or more secure elements are included in the storage device, the storage device can be implemented by combining two or more of the embodiments described with reference to FIGS. 20 through 26. In some exemplary embodiments, when two or more secure elements are included in the storage device, the storage device can be implemented by combining one or more of the embodiments described with reference to FIGS. 3 through 19 and one or more of the embodiments described with reference to FIGS. 20 through 26.

Figure 27:
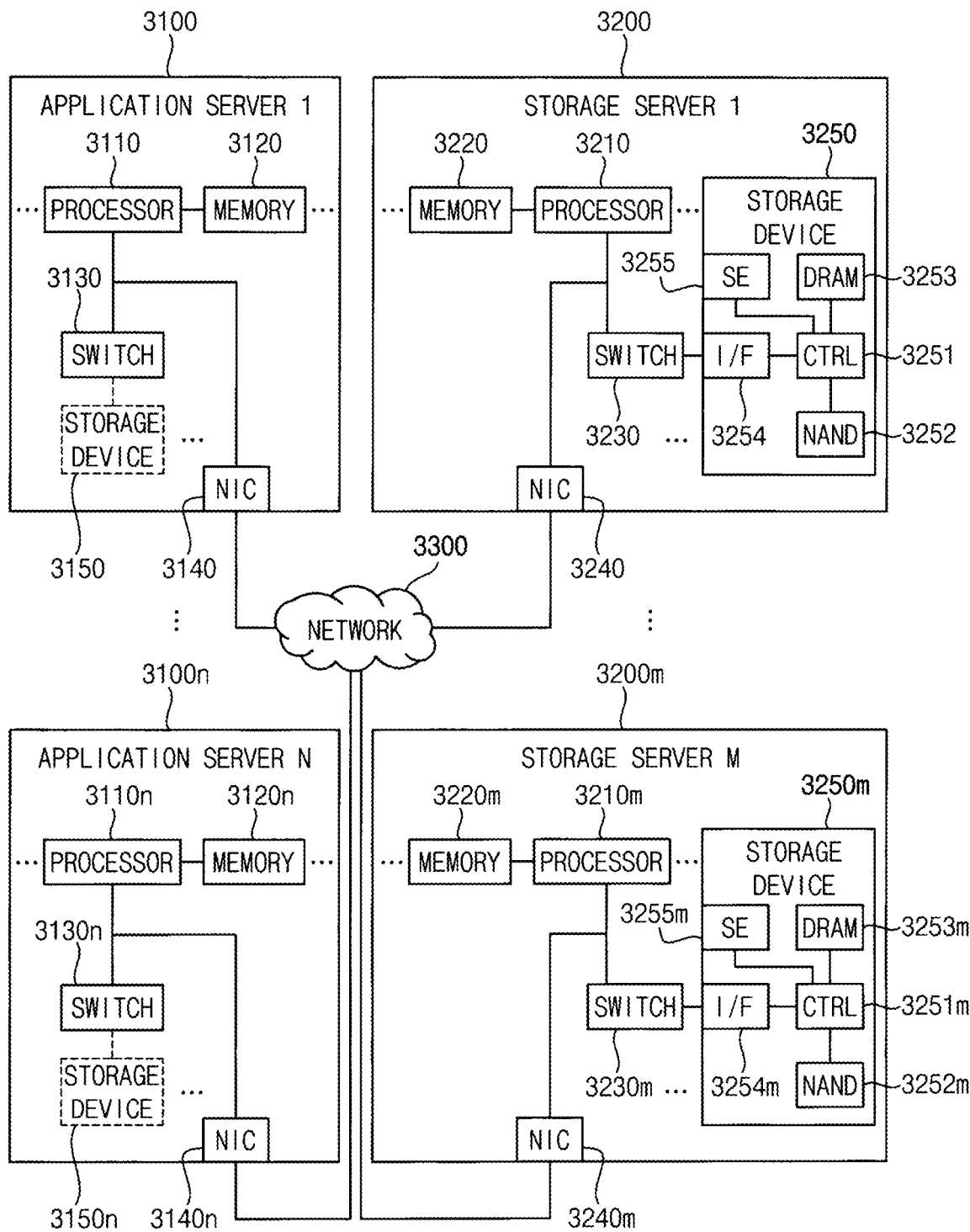
FIG. 27 is a block diagram of a data center that includes a storage device according to exemplary embodiments.

FIG. 27 is a block diagram of a data center that includes a storage device according to exemplary embodiments.

Referring to FIG. 2 in an embodiment, a data center 3000 is a facility that collects various types of data and provides various services, and may be referred to as a data storage center. The data center 3000 is a system for operating search engines and databases, and may be a computing system used by or such as banks or government agencies. The data center 3000 includes application servers 3100 to 3100n and storage servers 3200 to 3200m. The number of the application servers 3100 to 3100n and the number of the storage servers 3200 to 3200m may vary according to exemplary embodiments, and the number of the application servers 3100 to 3100n and the number of the storage servers 3200 to 3200m may differ from each other.

In an embodiment, the application server 3100 includes at least one processor 3110 and at least one memory 3120, and the storage server 3200 includes at least one processor 3210 and at least one memory 3220. An operation of the storage server 3200 will be described as an example. The processor 3210 controls the overall operations of the storage server 3200, and accesses the memory 3220 to execute instructions or data loaded in the memory 3220. The memory 3220 includes at least one of a double data rate (DDR) synchronous dynamic random access memory (SDRAM), a high bandwidth memory (HBM), a hybrid memory cube (HMC), a dual in-line memory module (DIMM), an Optane DIMM, or a nonvolatile DIMM (NVDIMM), etc. The number of the processors 3210 and the number of the memories 3220 included in the storage server 3200 may vary according to exemplary embodiments. In some exemplary embodiments, the processor 3210 and the memory 3220 form a processor-memory pair. In some exemplary embodiments, the number of the processors 3210 and the number of the memories 3220 differ from each other. The processor 3210 may include a single core processor or a multiple core processor. The above description of the storage server 3200 also applies to the application server 3100. The application server 3100 includes at least one storage device 3150, and the storage server 3200 includes at least one storage device 3250. In some exemplary embodiments, the application server 3100 does not include the storage device 3150. The number of the storage devices 3250 included in the storage server 3200 may vary according to exemplary embodiments.

In an embodiment, the application servers 3100 to 3100n and the storage servers 3200 to 3200m communicate with each other through a network 3300. The network 3300 can be implemented using a fiber channel (FC) or an Ethernet. The FC is a medium used for a relatively high speed data transmission, and an optical switch that provides high performance and/or high availability is used. The storage servers 3200 to 3200m may be file storages, block storages or object storages according to an access scheme of the network 3300.

In some exemplary embodiments, the network 3300 is a storage-only network or a network dedicated to storage such as a storage area network (SAN). For example, the SAN is an FC-SAN that uses an FC network and is implemented according to an FC protocol (FCP). For another example, the SAN is an IP-SAN that uses a transmission control protocol/internet protocol (TCP/IP) network and is implemented according to an iSCSI (a SCSI over TCP/IP or an Internet SCSI) protocol. In other exemplary embodiments, the network 3300 is a general or normal network such as a TCP/IP network. For example, the network 3300 can be implemented according to at least one protocol, such as an FC over Ethernet (FCoE), a network attached storage (NAS), or a nonvolatile memory express (NVMe) over Fabrics (NVMe-oF), etc.

Hereinafter, exemplary embodiments will be described based on the application server 3100 and the storage server 3200. The description of the application server 3100 applies to the other application server 3100n, and the description of the storage server 3200 applies to the other storage server 3200m.

In an embodiment, the application server 3100 stores data requested by a user or a client through the network 3300 into one of the storage servers 3200 to 3200m. In addition, the application server 3100 obtains data requested by the user or the client from one of the storage servers 3200 to 3200m through the network 3300. For example, the application server 3100 is implemented as a web server or a database management system (DBMS).

In an embodiment, the application server 3100 accesses a memory 3120n or a storage device 3150n in the other application server 3100n through the network 3300, or accesses the memories 3220 to 3220m or the storage devices 3250 to 3250m in the storage servers 3200 to 3200m through the network 3300. Thus, the application server 3100 performs various operations on data stored in the application servers 3100 to 3100n or the storage servers 3200 to 3200m. For example, the application server 3100 executes a command that moves or copies data between the application servers 3100 to 3100n or the storage servers 3200 to 3200m. The data is transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In an embodiment, in the storage server 3200, an interface 3254 provides a physical connection between the processor 3210 and a controller 3251, or as physical connection between a network interface card (NIC) 3240 and the controller 3251. For example, the interface 3254 is implemented based on a direct attached storage (DAS) scheme in which the storage device 3250 is directly connected with a dedicated cable. For another example, the interface 3254 is implemented based on at least one of various interface schemes, such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UPS (eUPS) interface, or a compact flash (CF) card interface, etc.

In an embodiment, the storage server 3200 further includes a switch 3230 and the NIC 3240. The switch 3230 selectively connects the processor 3210 with the storage device 3250, or selectively connects the NIC 3240 with the storage device 3250 under a control of the processor 3210. Similarly, the application server 3100 further include, a switch 3130 and an NIC 3140.

In some exemplary embodiments, the NIC 3240 includes a network interface card or a network adapter, etc. The NIC 3240 may be connected to the network 3300 through a wired interface, a wireless interface, a Bluetooth interface, or an optical interface, etc. The NIC 3240 further includes an internal memory, a digital signal processor (DSP), a host bus interface, etc., and is connected to the processor 3210 or the switch 3230 through the host bus interface. The host bus interface can be implemented as one of the above-described examples of the interface 3254. In some exemplary embodiments, the NEC 3240 is integrated with at least one of the processor 3210, the switch 3230 and the storage device 3250.

In an embodiment, in the storage servers 3200 to 3200m or the application servers 3100 to 3100n, the processor transmits a command to the storage devices 3150 to 3150n and 3250 to 3250m or the memories 3120 to 3120n and 3220 to 3220m to program or read data. For example, the data is error-corrected data from an error correction code (ECC) engine. For example, the data has been processed by a data bus inversion (DBI) or a data masking (DM), and includes cyclic redundancy code (CRC) information. For example the data is encrypted data for security or privacy.

In an embodiment, the storage devices 3150 to 3150m and 3250 to 3250m transmit a control signal and command/address signals to NAND flash memory devices 3252 to 3252m in response to a read command received from the processor. When data is read from the NAND flash memory devices 3252 to 3252m, a read enable (RE) signal is input as a data output control signal and serves to output data to a DQ bus. A data strobe signal (DQS) is generated using the RE signal. The command and address signals are latched in a page buffer based on a rising edge or a falling edge of a write enable (WE) signal.

In an embodiment, the controller 3251 controls overall operations of the storage device 3250. In some exemplary embodiments, the controller 3251 includes a static random access memory (SRAM). The controller 3251 writes data into the NAND flash memory device 3252 in response to a write command, or reads data from the NAND flash memory device 3252 in response to a read command. For example, the write command or the read command may be received from the processor 3210 in the storage server 3200, the processor 3210m in the other storage server 3200m, or the processors 3110 to 3110n in the application servers 3100 to 3100n. A DRAM 3253 temporarily stores data to be written to the NAND flash memory device 3252 or data read from the NAND flash memory device 3252. Further, the DRAM 3253 stores meta data. The meta data is generated by the controller 3251 to manage user data or the NAND flash memory device 3252. The storage device 3250 includes a secure element 3255 for security or privacy.

Each of the storage devices 3150 to 3150m and 3250 to 3250m may be storage devices according to exemplary embodiments described with reference to FIGS. 1 through 26.

Figure 28:
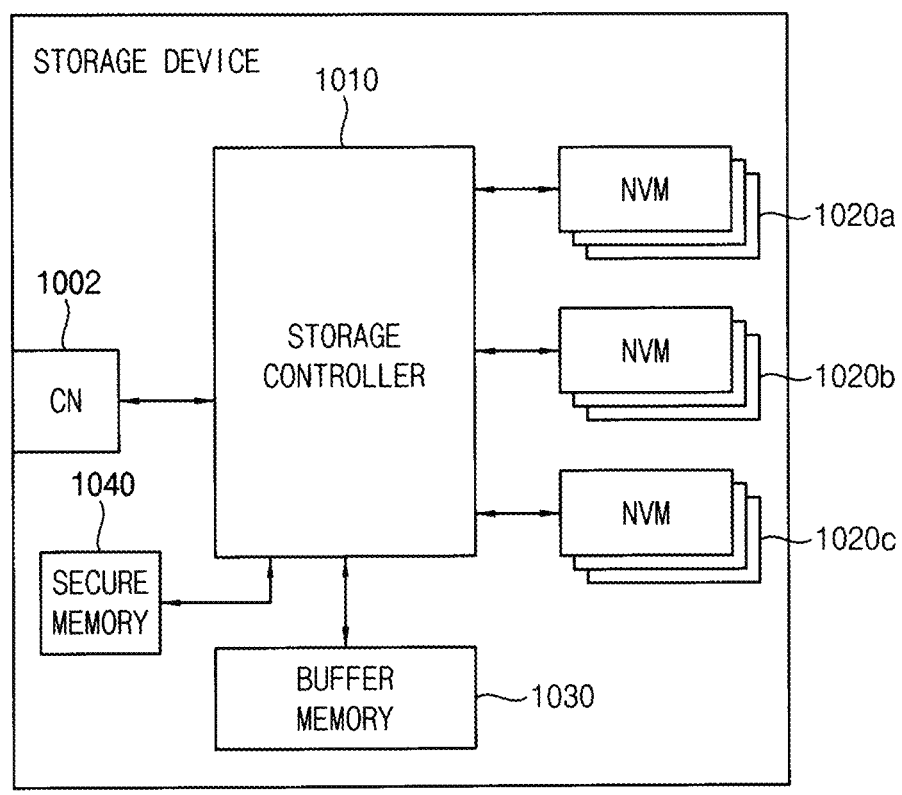
FIGS. 28 and 29 are block diagrams of embodiments of a storage device included in the data center of FIG. 27.
Figure 29:
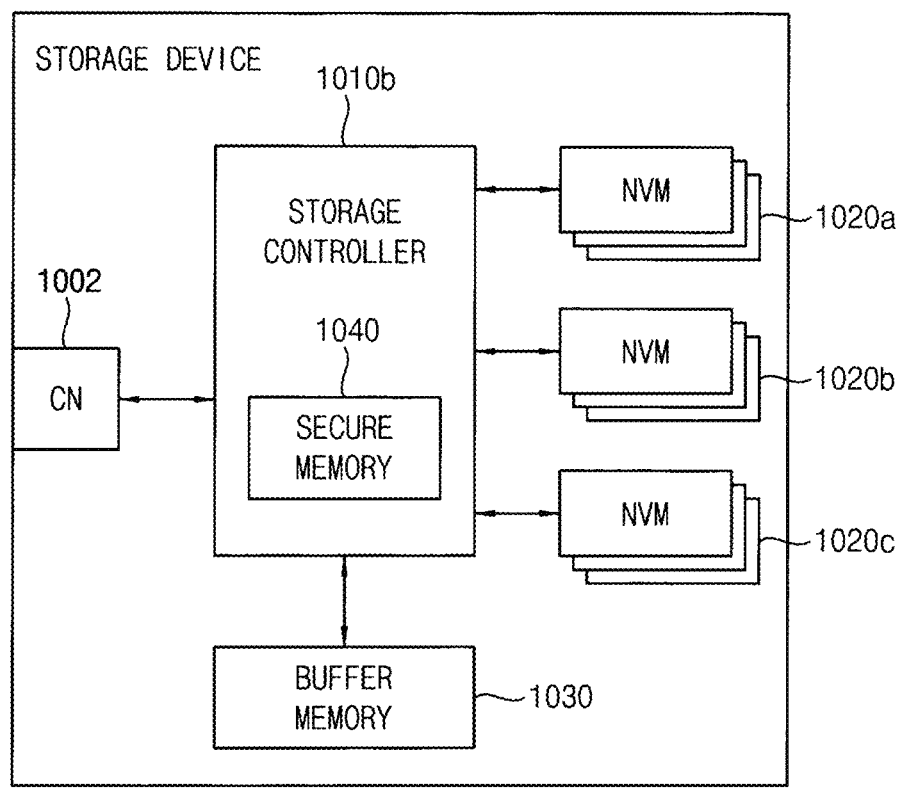

FIGS. 28 and 29 are block diagrams of embodiments of a storage device in the data center of FIG. 27.

Referring to FIG. 28, in an embodiment, a storage device 1000a includes a connector 1002, a storage controller 1010, a plurality of nonvolatile memories 1020a, 1020b and 1020c, a buffer memory 1030 and a secure memory 1040.

In an embodiment, the connector 1002, the storage controller 1010, the plurality of nonvolatile memories 1020a, 1020b and 1020c, the buffer memory 1030 and the secure memory 1040 correspond to the connector 110, the controller 210, the plurality of nonvolatile memories 220, the buffer memory 230 and the secure element 240 in FIG. 2, respectively.

In an embodiment of FIG. 28, the secure memory 1040 is an individual chip separated from the storage controller 1010 and the plurality of nonvolatile memories 1020a, 1020b and 1020c. In this embodiment, a coupling structure described with reference to one or more of FIGS. 3 through 26 can be cased to integrally couple the secure memory 1040 with a case.

Referring to FIG. 29, in an embodiment, a storage device 1000b includes a connector 1002, a storage controller 1010b, a plurality of nonvolatile memories 1020a, 1020b and 1020c, a buffer memory 1030 and a secure memory 1040. The storage device 1000b is substantially the same as the storage device 1000a of FIG. 28, except that the secure memory 1040 is disposed or included in the storage controller 1010b.

In an embodiment of FIG. 29, the secure memory 1040 is integrated with the storage controller 1010b to form a single chip. In this embodiment, a coupling structure described with reference to one car more of FIGS. 3 through 26 can be used to integrally couple the storage controller 1010b that includes the secure memory 1040 with a case.

In another embodiment, the secure memory 1040 is integrated with one of the plurality of nonvolatile memories 1020a, 1020b and 1020c to form a single chip. In this embodiment, a coupling structure described with reference to one or more of FIGS. 3 through 26 can be used to integrally combine a nonvolatile memory that includes the secure memory 1040 with a case.

FIG. 30 is a block diagram of an embodiment of a memory in the storage device of FIG. 28 or FIG. 29.

Referring to FIG. 30, in an embodiment, a memory 500 includes a memory cell array 510, an address decoder 520, a page buffer circuit 530, a data input/output (I/O) circuit 540, a voltage generator 550 and a control circuit 560. The memory 500 may be one of the plurality of nonvolatile memories 1020a, 1020b and 1020c in FIGS. 28 and 29 or may be the secure memory 1040 in FIGS. 28 and 29.

In an embodiment, the memory cell array 510 includes a plurality of memory cells that store data. The control circuit 560 controls an operation of the memory 500 based on a command CMD and an address ADDR. The address decoder 520 is connected to the memory cell array 510 through a plurality of string selection lines SSL, a plurality of wordlines WL and a plurality of ground selection lines GSL. The voltage generator 550 generates voltages VS and VERS required for the operation of the memory 500 based on an externally rexceived power voltage PWR and control signals CON received from the control circuit 560. The address decoder 520 generates the signals that are transmitted to the memory cell array through the string selection lines SSL, a plurality of wordlines WL and a plurality of ground selection lines GSL from the voltage VS and a row select signal R_ADDR received from the control circuit 560. The page buffer circuit 530 is connected to the memory cell array 510 through a plurality of bitlines BL and receives a page buffer control signal PBC from the control circuit 560. The data I/O circuit 540 receives a column address signal C_ADDR from the control circuit 560, is connected to the page buffer circuit 530 through data lines DL, and receives write data DAT or outputs read data DAT.

In an embodiment, if the memory 500 is the secure memory 1040, the memory 500 can be externally destroyed by separating the memory 500 from a substrate when a case is removed or separated, as described with reference to FIGS. 3 through 19. In addition, the memory 500 can be internally destroyed. For example, a structure of the memory cell array 510 may be destroyed, at least one of the circuits other than the memory cell array 510 may be destroyed, or a connection between the memory cell array 510 and the other circuits may be damaged.

Embodiments of the inventive concept can be incorporated into various electronic devices or systems that include storage devices or SSD devices. For example, embodiments of the inventive concept can be incorporated into systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything, (IoE) device, an e-book reader a virtual reality (VR) device, an augmented reality (AR) device, a robotic device, or a drone, etc.

The foregoing is illustrative of exemplary embodiments and is not to be construed as limiting thereof. Although some exemplary embodiments have been described, those skilled in the art will readily appreciate that many modifications are possible in exemplary embodiments without materially departing from the novel teachings of exemplary embodiments. Accordingly, all such modifications are intended to be included within the scope of exemplary embodiments as defined in the claims. Therefore, it is to be understood that the foregoing is illustrative of various exemplary embodiments and is not to be construed as limited to specific exemplary embodiments disclosed, and that modifications to disclosed exemplary embodiments, as well as other exemplary embodiments, are intended to be included within the scope of the appended claims.

What is claimed is:

1. A storage device, comprising:
   a substrate;
   at least one secure element mounted on the substrate;
   a case that surrounds the substrate and the secure element; and
   a coupling structure that integrally couples the secure element and the case,
   wherein, when at least a part of the case is removed, the secure element is destroyed while a connection is maintained between the secure element and the case by the coupling structure, wherein access to secure data stored in the secure element is prevented.

2. The storage device of claim 1, wherein the coupling structure includes:
   a first coupling part disposed on a first surface of the secure element; and
   a first protrusion disposed in the case,
   wherein the secure element and the case are integrally coupled by inserting the first protrusion into the first coupling part.

3. The storage device of claim 2, wherein, when at least the part of the case is removed, the secure element is destroyed by separating the secure element from the substrate while the fast protrusion remains inserted into the first coupling part.

4. The storage device of claim 2, wherein the case includes:
   a lower case on which the substrate is mounted; and
   an upper case coupled with the lower case and that covets the substrate and the secure element,
   wherein the first protrusion is disposed in the upper case.

5. The storage device of claim 3, wherein the secure element is separated from the substrate and the secure element is internally destroyed, and access to the secure element using an external device is prevented.

6. The storage device of claim 2, wherein the coupling structure further includes:
   a second coupling part formed on a second surface of the secure element; and
   a second protrusion formed in the case,
   wherein the secure element and the case are further integrally coupled by inserting the second protrusion into the second coupling part.

7. The storage device of claim 1, wherein the coupling structure includes:
   a first protrusion formed in the case,
   wherein the secure element and the case are integrally coupled by the first protrusion.

8. The storage device of claim 1, wherein the coupling structure includes:

an adhesive layer disposed between the secure element and the case, wherein the secure element and the case are integrally coupled by attaching the secure element to the case by the adhesive layer.

9. The storage device of claim 8, wherein, when at least the part of the case is removed, the secure element is destroyed by separating the secure element from the substrate while the secure element remains attached to the case by the adhesive layer.

10. The storage device of claim 8, wherein the coupling structure further includes:

a beat dissipation layer interposed between the secure element and the adhesive layer or between the case and the adhesive layer.

11. The storage device of claim 8, wherein the coupling structure further includes:

an electrostatic discharge (ESD) protection layer interposed between the secure element and the adhesive layer or between the case and the adhesive layer.

12. The storage device of claim 10, wherein the coupling structure includes:

an electrical material disposed between the secure element and the case, wherein the secure element and the case are integrally coupled by connecting the secure element to the case by the electrical material.

13. The storage device of claim 12, wherein:

the electrical material includes a flexible printed circuit board (FPGB), and when at least the part of the case is removed, the secure element is destroyed by damaging at least a part of the FPCB.

14. The storage device of claim 12, wherein:

the electrical material includes at least one conductive wire, and when at least the part of the case is removed, the secure element is destroyed by separating the secure element from the substrate while the secure element remains connected to the case by the conductive wire.

15. A storage device, comprising:

a substrate;

at least one secure element mounted on the substrate;

a case that surrounds the substrate and the secure element; and a coupling structure that integrally couples the secure element and the case, wherein, when at least a part of the case is removed, the secure element is separated and removed from the substrate while the secure element and the case remain connected by the coupling structure, wherein access to secure data stored in the secure element is prevented.

16. The storage device of claim 15, wherein, when the secure element is electrically connected to the substrate after the secure element has been separated and removed from the substrate, access to the secure data stored in the secure element is restored.

17. The storage device of claim 15, further comprising:

a plurality of electrical coupling parts disposed on the substrate; and a plurality of electrical protrusions disposed in the secure element, wherein the secure element and the substrate are electrically connected to each other by inserting the plurality of electrical protrusions into the plurality of electrical coupling parts.

18. The storage device of claim 15, wherein the coupling structure includes:

a first coupling part and a second coupling part formed on a first surface and a second surface of the secure element; and a first protrusion and a second protrusion disposed in the case, and wherein the secure element and the case are integrally coupled by inserting the first protrusion and the second protrusion into the first coupling part and the second coupling part.

19. The storage device of claim 15, wherein the coupling structure includes:

an adhesive layer disposed between the secure element and the case, wherein the secure element and the case are integrally coupled by attaching the secure element to the case by the adhesive layer.

20. A solid state drive (SSD) device, comprising:

a substrate;

a plurality of nonvolatile memories mounted on the substrate and that store normal data;

at least one secure memory mounted on the substrate and that stores secure data;

a controller mounted on the substrate and that controls operations of the plurality of nonvolatile memories and the secure memory;

a case that surrounds the substrate, the plurality of nonvolatile memories, the secure memory and the controller; and a coupling structure that integrally couples the secure memory and the case, wherein, when at least a part of the case is removed, the secure memory is destroyed or the secure memory is separated and removed from the substrate while a connection remains between the secure memory and the case by the coupling structure, and access to the secure data stored in the secure memory is prevented.

* * * * *